July 8, 1952  R. H. SCHUMAN  2,602,214
MACHINE TOOL
Filed Aug. 15, 1949  7 Sheets-Sheet 1
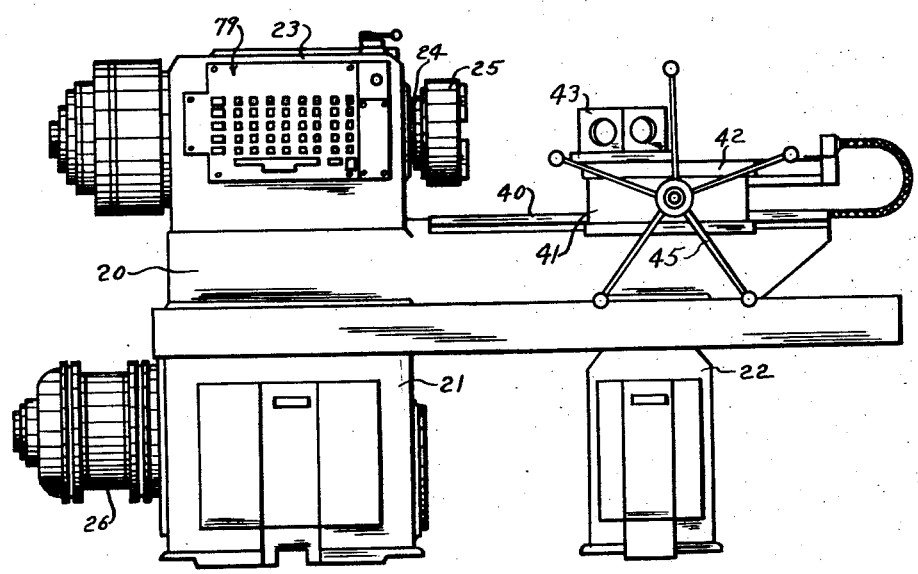
Fig. 1
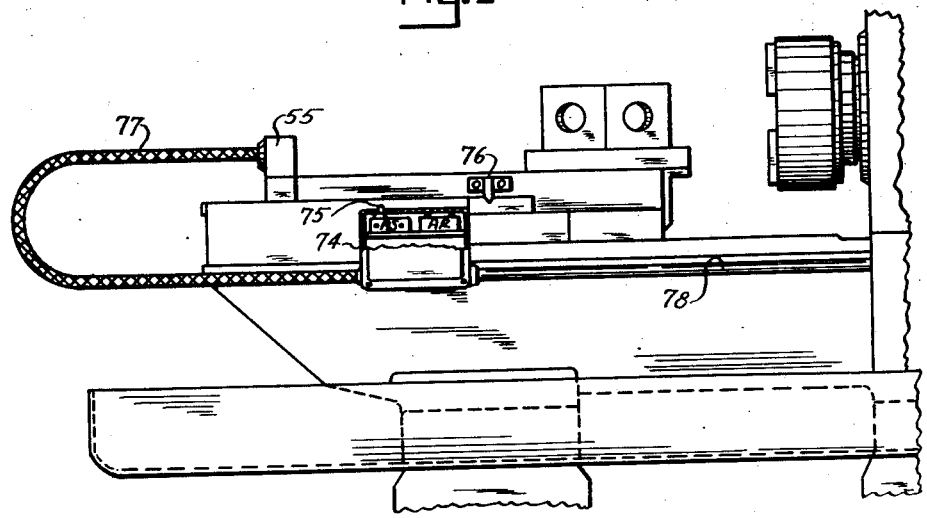
Fig. 2
|  | HIGH DIRECT | LOW DIRECT | HIGH BACK | LOW BACK | AUTO |
|---|---|---|---|---|---|
| REVERSE | FS | FS HS | FS BS | FS HS BS | 116 |
| OFF | RS | RS HS | RS BS | RS HS BS | RS 116 |
| FORWARD |  | HS | BS | HS BS | 116 |
Fig. 16
INVENTOR.
RALPH H. SCHUMAN
BY Hudson, Boughton,
Williams, David & Hoffmann.
ATTORNEYS

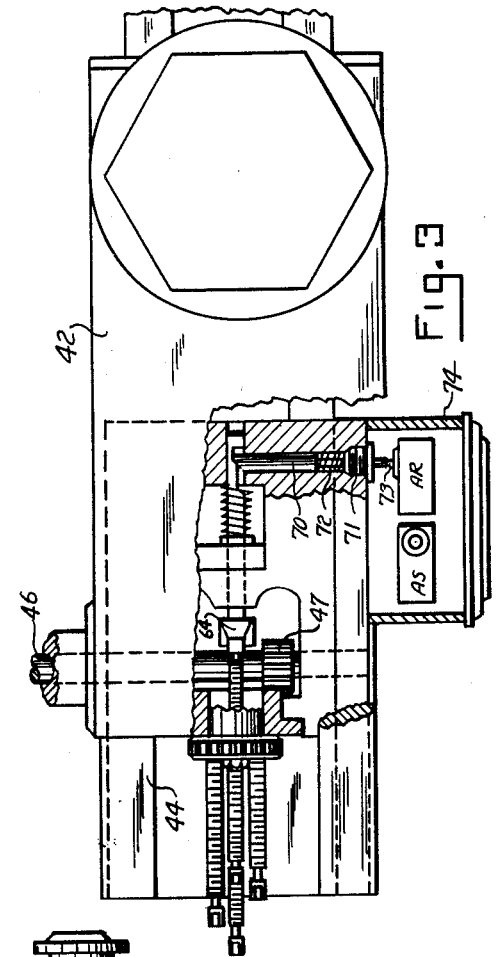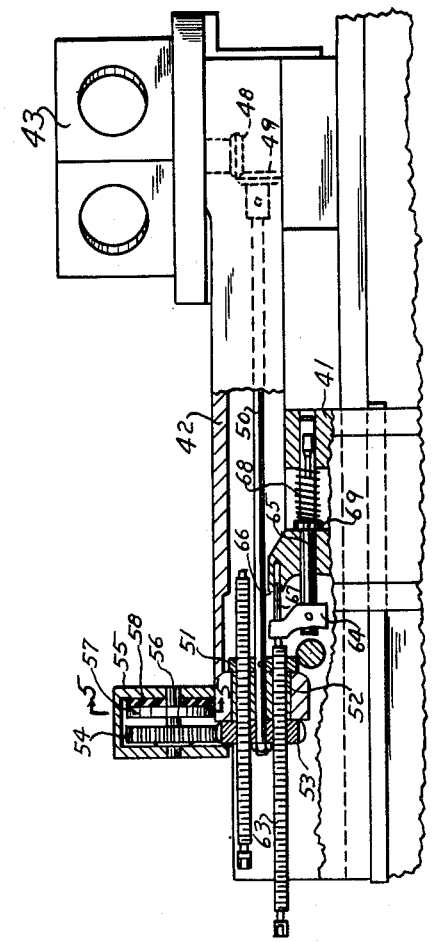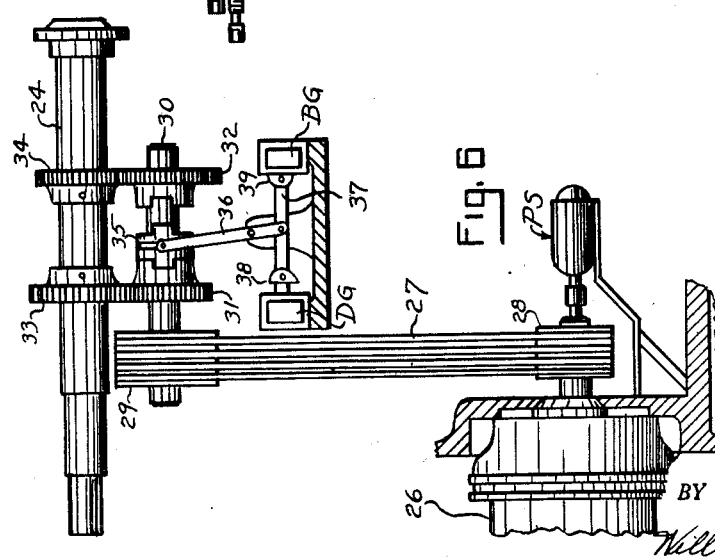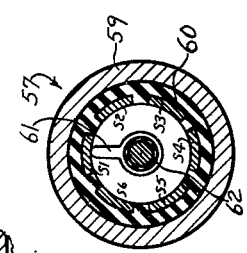

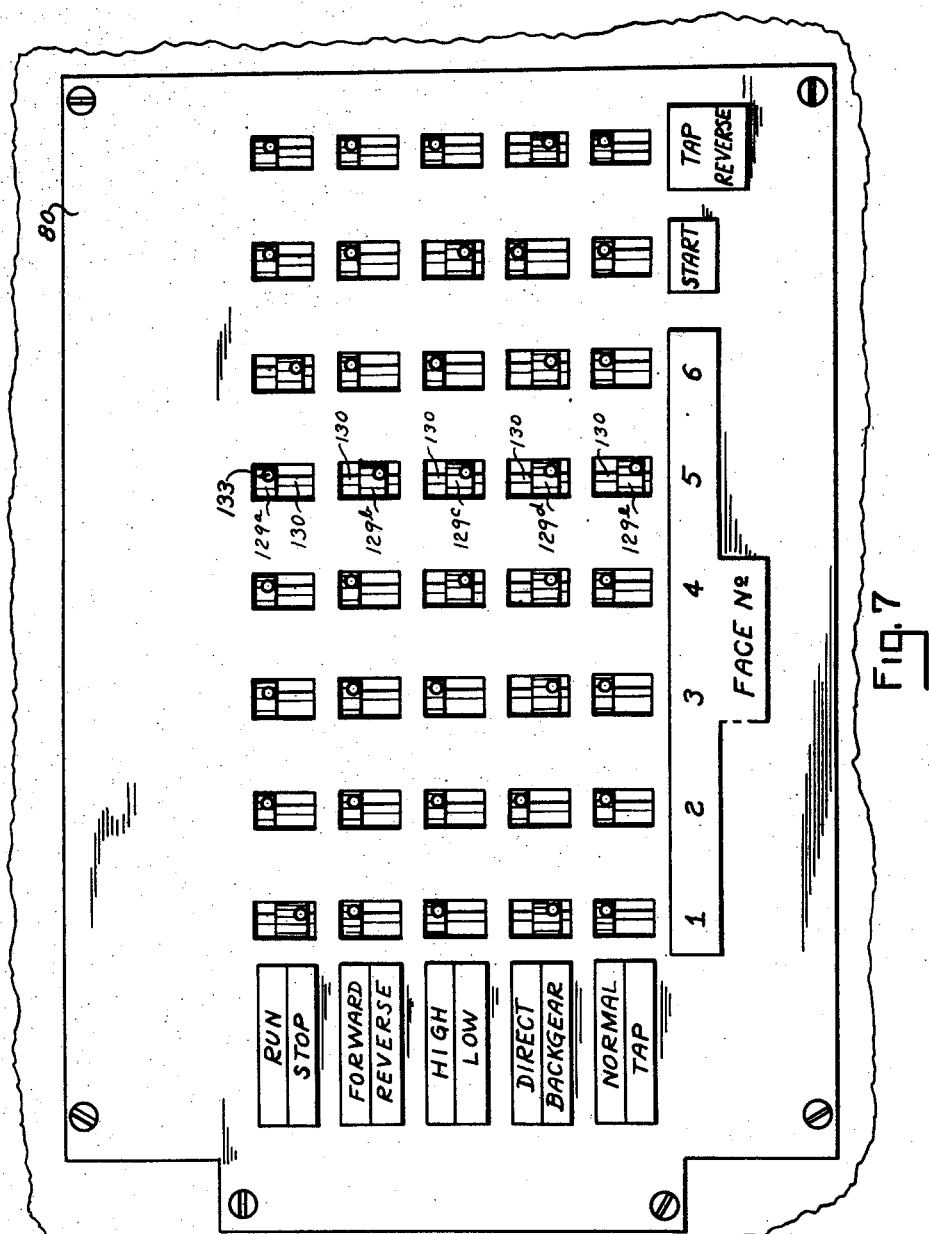

July 8, 1952 R. H. SCHUMAN 2,602,214
MACHINE TOOL
Filed Aug. 15, 1949 7 Sheets-Sheet 4
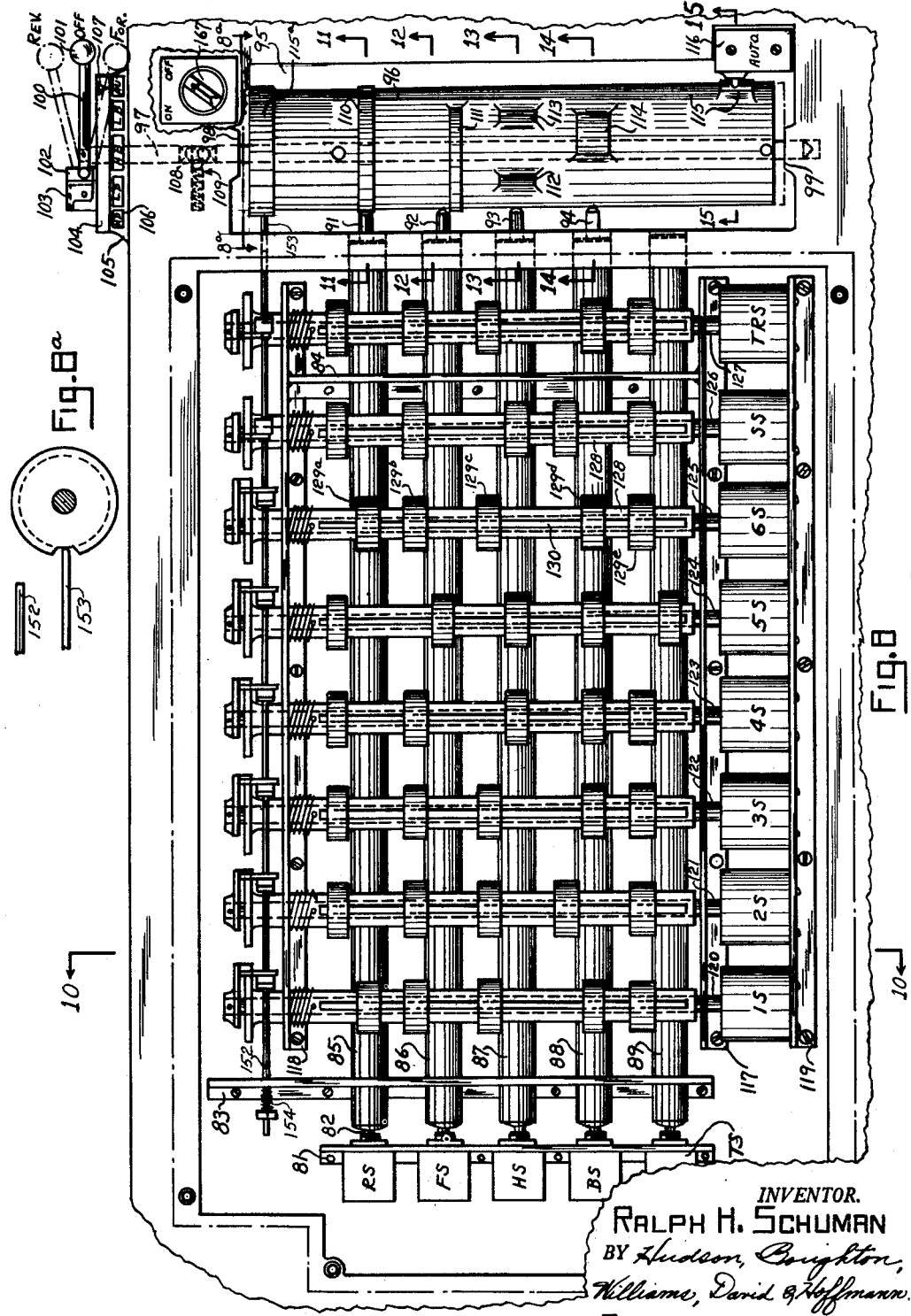
INVENTOR.
RALPH H. SCHUMAN
BY Hudson, Boughton,
Williams, David & Hoffmann.
ATTORNEYS July 8, 1952 R. H. SCHUMAN 2,602,214
MACHINE TOOL
Filed Aug. 15, 1949 7 Sheets-Sheet 5

INVENTOR.
RALPH H. SCHUMAN
BY Hudson, Boughton,
Williams, David & Hoffmann
ATTORNEYS

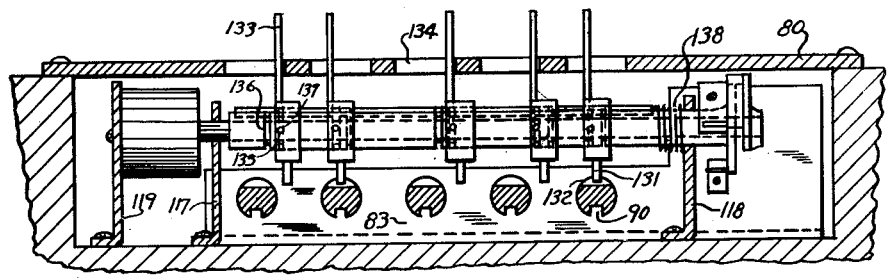
Fig. 10
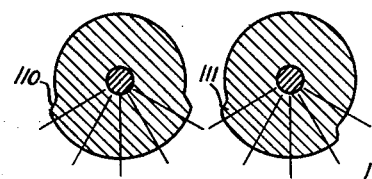
Fig. 11  Fig. 12  Fig. 13  Fig. 14  Fig. 15
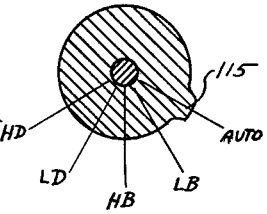
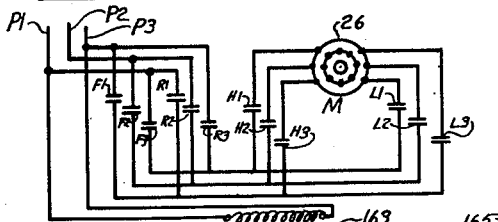
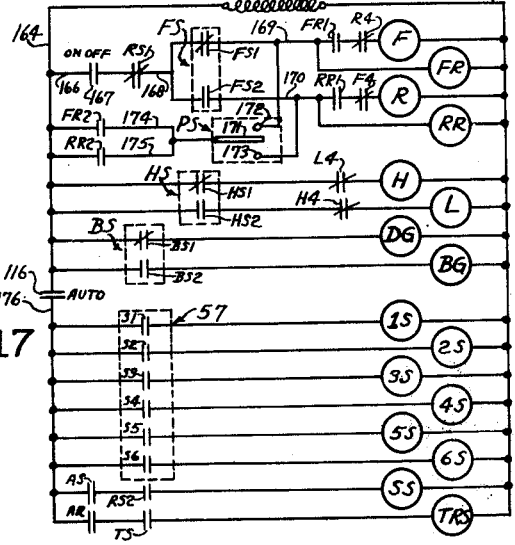
Fig. 17
Fig. 18
INVENTOR.
RALPH H. SCHUMAN
BY Hudson, Boughton,
Williams, David & Hoffmann.
ATTORNEYS Patented July 8, 1952

2,602,214

UNITED STATES PATENT OFFICE 2,602,214

MACHINE TOOL

Ralph H. Schuman, Cleveland, Ohio, assignor to The Warner & Swasey Company, Cleveland, Ohio, a corporation of Ohio Application August 15, 1949, Serial No. 110,308

30 Claims. (Cl. 29—64)

This invention relates to machine tools and, more particularly, to a machine tool adapted to perform machining and threading operations upon relatively small workpieces, although the invention may be advantageously employed in a machine tool for different types of workpieces.

An object of the invention is to provide a machine tool which is so constructed and its operation so controlled that it will function in an improved, more rapid, and more efficient manner, thereby enabling workpieces to be more economically produced.

Another object of the invention is to provide a machine tool, having a spindle rotatable at different speeds in either direction, with improved means enabling the operator to rapidly condition the machine tool for sequential operation of the spindle at different preselected speeds and directions of rotation for each of a plurality of separate machining operations thereby facilitating the rapid production of workpieces requiring a plurality of different machining operations by reducing the time necessary to condition the machine tool for each successive operation.

A further object of the invention is to provide a machine tool of the type described in the preceding object, and having a member indexible in accordance with the machining operations to be performed, wherein the means for conditioning the machine tool is so constructed and arranged that the desired speed and direction of rotation of the work spindle for each operation in a complete cycle of machining operations may be readily preselected so that the work spindle automatically operates at the proper speed and direction of rotation for each given operation upon initiating that operation.

A still further object of the invention is the provision of a machine tool of the type defined in the two immediately preceding objects and wherein a single manually operable means is provided for conditioning the machine tool to operate the work spindle at a desired speed and direction of rotation for a given operation regardless of the preselected conditioning of the machine.

An additional object of the invention is the provision of improved control means for a machine tool of the type having a spindle driven by a reversible multispeed electric motor under control of electrical switches and a slide provided with an indexible turret, the control means comprising improved means for actuating the said switches either automatically in accordance with a preselected pattern, upon indexing of the turret, or manually independently of the indexing of the turret.

A more specific object of the invention is to provide an improved machine tool control means comprising two sets of movable members, one set of members adapted, when moved, to actuate switches for controlling the speed, direction of rotation and starting or stopping of the work spindle of the machine tool and the other of said set of movable members being adapted to be actuated in response to indexing the turret of the machine tool, the said two sets of members extending angularly with respect to each other and manually shiftable means being provided for effecting selective operative connections of the members of one set with the members of the other of said sets, whereby actuation of one of said members of said other set actuates each of the members of the said one set which have been operatively connected with the actuated member.

The invention further resides in certain novel features of construction and combinations and arrangements of parts, and further objects and advantages thereof will be apparent to those skilled in the art to which the invention pertains from the following description of the present preferred embodiment thereof, described with reference to the accompanying drawings in which similar reference characters represent corresponding parts in the several views and in which:

Fig. 1 is a front elevational view of a machine tool to which the invention has been applied, the machine tool being shown for purposes of illustration as a turret lathe of the type in which the turret slide is manually moved and the turret is indexed by the movement of the slide;

Fig. 2 is an enlarged fragmentary rear elevational view of the left-hand portion of the machine tool as shown in Fig. 1 with a portion of one of the control boxes broken away to illustrate the switches therein;

Fig. 3 is a fragmentary top plan view of the left-hand portion of the machine tool as viewed in Fig. 2 with portions of the slide and other parts broken away to illustrate the stop roll and the switch operated thereby;

Fig. 4 is a side view of the portion of the mechanism illustrated in Fig. 3 with parts broken away and others shown in section to further illustrate the stop roll and the indexible switching mechanism;

Fig. 5 is an enlarged detached sectional view through the indexing switch mechanism illustrated in Fig. 4, the view being taken substantially on the line 5—5 of Fig. 4;

Fig. 6 is a detached fragmentary view, principally in side elevation, illustrating the driving motor, change speed gearing and the spindle of the machine tool;

Fig. 7 is an enlarged fragmentary elevational view of the preselector portion of the control mechanism illustrated in Fig. 1;

Fig. 8 is a fragmentary enlarged view of a portion of the headstock of a machine tool shown in Fig. 1 with the cover for the preselector portion of the control means removed to reveal the internal construction thereof, this view also illustrating the manual means for operating the mechanism;

Fig. 8a is a fragmentary sectional view through a portion of the manual control means, the view being taken on the line 8a—8a of Fig. 8 and showing the cam drum in top plan;

Fig. 10 is a sectional view through the control means taken substantially on the line 10—10 of Fig. 8;

Fig. 11 is a fragmentary sectional view through a portion of the manual control means, the view being taken on the line 11—11 of Fig. 8;

Fig. 12 is a view similar to Fig. 11 but taken on the line 12—12 of Fig. 8;

Fig. 13 is a view similar to Fig. 11 but taken on the line 13—13 of Fig. 8;

Fig. 14 is a view similar to Fig. 11 but taken on the line 14—14 of Fig. 8;

Fig. 15 is also a view similar to Fig. 11 but taken on the line 15—15 of Fig. 8;

Fig. 16 is a chart representing those switches of the control means which are operated for a given setting of the manual control means;

Fig. 17 is a simplified schematic wiring diagram of the controls for the motor of the machine tool;

Figure 19:
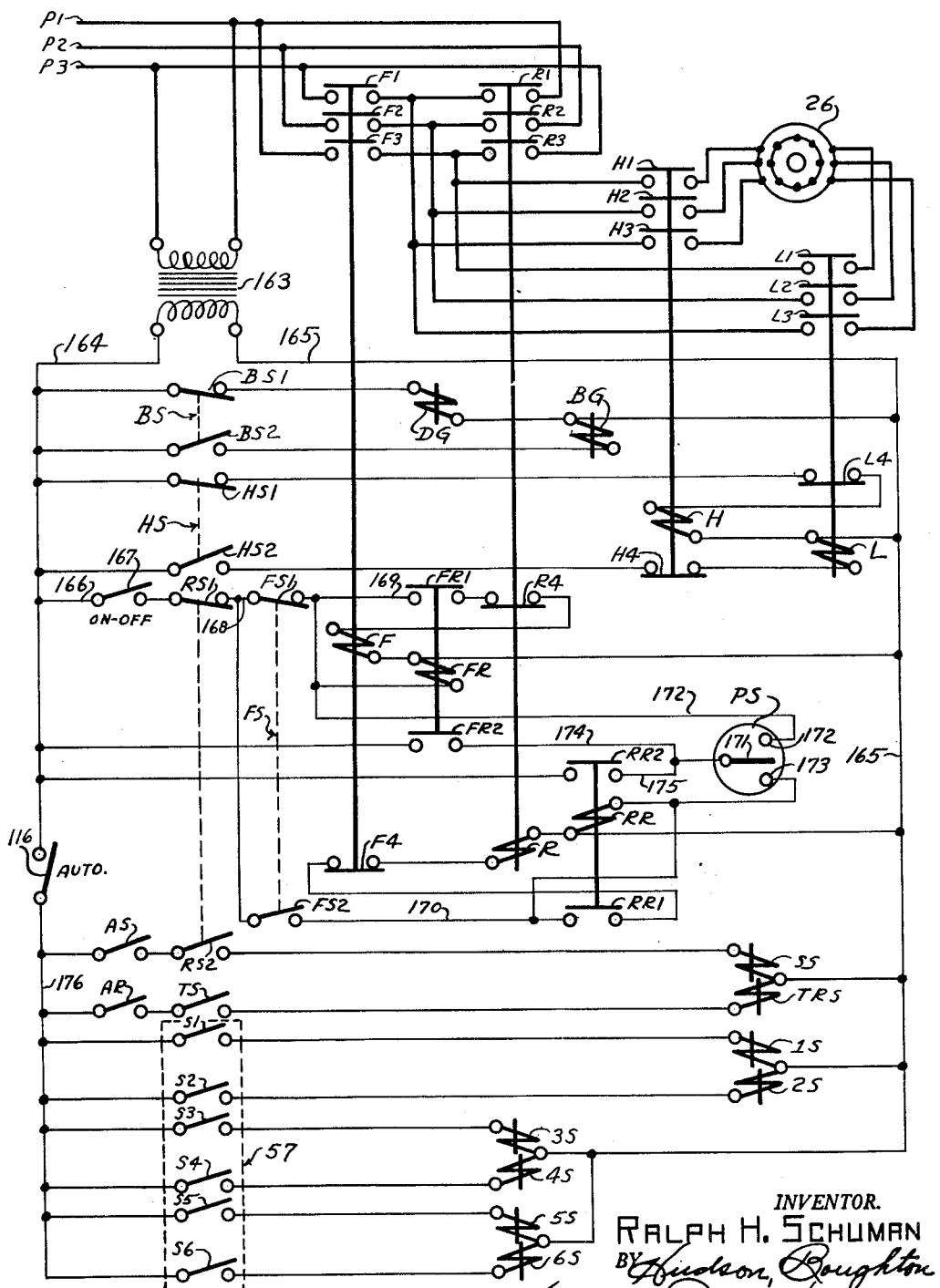

Fig. 18 is a key to the wiring diagram of Fig. 17 illustrating the relationship of the several relays and contactors to their respective contacts, the coil of each relay or contactor in Fig. 18 being in horizontal alignment with its representation in Fig. 17 and the contacts operated by each coil or relay being in vertical alignment in Fig. 18 with the representation of its operating coil, the several contacts being also in horizontal alignment with the representations of these contacts in Fig. 17; and, Fig. 19 is a wiring diagram of the controls for the motor of the machine tool, the circuit being the same as illustrated in Fig. 17 but employing the conventional Patent Office symbols.

Referring first to Figs. 1 through 4, the machine tool shown therein is for the sake of convenience illustrated as a turret lathe and comprises a bed 20 supported on spaced pedestals 21 and 22. A headstock 23 is carried by one end of the bed 20 and rotatably supports the work spindle 24 and chuck 25. The spindle and chuck are driven by a reversible multispeed electrical motor 26, see Fig. 6, supported upon the pedestal 21. For this purpose, belts 27 extend around a pulley 28 on the motor shaft and a similar pulley 29 upon a transmission shaft 30. The shaft 30 carries gears 31 and 32 which are freely rotatable relative to the shaft and mesh respectively with a large gear 33 and a smaller gear 34 fixed to the spindle 24. The shaft 30 has a shiftable clutch member 35 connected for rotation therewith by which either the gear 31 or the gear 32 may be clutched to the shaft 30 for transmission of driving force to the spindle 24. For the sake of simplicity of illustration, the clutch member 35 is shown herein as a positive clutch element adapted to be shifted axially along the shaft 30 from a position where it positively engages the gear 31 to a position where it positively engages the gear 32. The mechanism for shifting the clutch element 35 is illustrated as comprising a lever 36, the spaced upper arms of which straddle the clutch member 35 in a well-known manner, the lever 36 being pivoted intermediate its ends to a stationary portion of the machine tool and the lower end of the lever 36 being pivoted to an intermediate portion of a shiftable link 37. The link 37 is pivotally connected at either end to the armatures 38 and 39 of pull type solenoids DG and BG, respectively.

It will be apparent from the construction just described that, when the solenoid BG is energized, as illustrated in Fig. 6, the spindle 24 is "back geared," that is the clutch 35 is in engagement with the gear 31 so that the latter drives the gear 33 and the spindle 24 at a lower speed than that of the shaft 30. When the solenoid BG is deenergized and the solenoid DG is energized the clutch 35 will be engaged with the gear 32 so that the latter then drives the spindle 24 through the gear 34, the resulting speed of rotation of the spindle being faster than that of the speed of rotation of the shaft 30, this position of the parts being hereinafter referred to as a "direct" connection. As mentioned heretofore, the motor 26 is of the multispeed type and hence for each of the above mentioned positions of the clutch member, that is, for either direct or back gearing of the spindle, a plurality of speeds is provided for the spindle corresponding with the various speeds of the motor 26.

The bed 20 of the machine tool is provided with longitudinally extending ways 40 which are parallel to the work spindle 24 and adjustably support a saddle 41 in a conventional manner. The saddle 41 in turn is provided with a turret slide 42 having an indexible turret 43 thereon. As is well known in the art, the saddle 41 may be moved to and clamped in an adjusted position on the ways 40 and the slide 42 is manually movable on the ways 44 of the saddle by means of a turnstile 45. This turnstile is fixed to a shaft 46 which carries a pinion 47, see Fig. 3, the shaft and pinion being rotatably supported in the saddle with the pinion meshing with a rack, not shown, carried by the slide 42 as is well known in the art. The turret 43 is indexed automatically by the movement of the slide 42 to its rearwardmost position by conventional mechanism of the type commonly provided for that purpose and therefore is not illustrated herein.

The central stud of the indexible turret 43 extends into the slide 42 and has fixed thereto a bevel gear 48, see Fig. 4, which meshes with a bevel gear 49 fixed to one end of a shaft 50. The shaft 50 extends parallel to the ways 44 rearwardly within the slide 42 and passes through and is fixed to a stop roll collar 51. The collar 51 abuts against one side of a bearing box formed in the slide 42 and the said collar is rigidly connected to one end of a cylindrical stop roll 52 which is rotatably fitted within the said bearing box. The end of the stop roll 52 opposite the collar 51 is rigidly connected with a spur gear 53, and the shaft 50 extends through the collar stop roll and gear 53 with a nut threaded on the outer end of the shaft 50. Consequently, the stop roll and the shaft 50 are held against relative endwise movement with respect to the slide 42 but are rotatable relative thereto.

The gear 53 meshes with a gear 54 contained within a housing 55 provided upon the slide 42 adjacent the end of the latter, the gear 54 being mounted upon a shaft 56 which is rotatably supported within the housing. The housing 55 is provided with an indexible switch mechanism, generally designated 57, and which is preferably separated from the housing by insulation 58. The indexible switch mechanism 57, see Fig. 5, preferably comprises an outer cylindrical casing member 59, the interior of which is provided with an insulating ring or sleeve 60. The inner periphery of the ring 60 is provided with arcuately shaped and circumferentially spaced conductive segments S1, S2, S3, S4, S5 and S6, there being one such conductive segment for each face of the turret, six such segments being illustrated since the turret shown is hexagonal. The shaft 56 extends into the housing 59 of the switching mechanism 57 and has a contact member or arm 61 mounted thereon for rotation therewith, this arm being preferably insulated from the shaft 56 by means of an insulating sleeve or the like 62. The arm 61 is adapted to have its outer end move successively into contact with the conductive segments S1 through S6 so as to form a plurality of switches with the arm 61 being the movable contact for each of the switches which are hereinafter simply designated by their stationary contact characters S1, etc.

It will be readily understood from the construction just described that the arm 61 is rotated or indexed in accordance with the indexing of the turret 43, the gears 48, 49 and 53, 54 having ratios such that the arm 61 moves the same angular distance as does the turret 43. Moreover, the conductive segments, S1 through S6, are spaced in accordance with the spacing of the several faces of the turret 43 so that when a given face of the turret 43 is positioned for cooperation with the chuck on the spindle 24, the contact arm 61 will be in engagement with the corresponding one of the conductive segments at substantially the midpoint of the latter. Thus, when the first face of the turret is in operative position with respect to the spindle, the arm 61 will be positioned in contact with the segment S1, see Fig. 5.

The stop roll collar 51 is provided with a plurality of circularly spaced openings arranged concentrically about the shaft 50 and aligned with threaded bores formed in the stop roll 52. Adjustable stop screws 63 extend through the threaded bores of the stop roll and through the openings in the collar 51, these screws being adjustable longitudinally relative to the stop roll by means of conventional wrench heads or similar expedients formed on the screws at the outer ends thereof. The stop screws correspond in number to the different indexed positions of the turret and since, as noted above, the shaft 50 is indexed in accordance with the indexing movement of the turret 43, the stop roll connected with the shaft 50 will likewise be indexed thereby bringing the stop screws 63 successively into line with a movable stop member 64.

The stop member 64 is fixed to a cam rod 65 which is slidably supported in a portion of the saddle 41 of the machine tool and which portion is also provided with a positive stop lug or abutment 66 against which the movable stop member 64 abuts after it has been moved by that stop screw 63, which is in alignment therewith, upon sliding movement of the turret to its forward position. The positive stop lug 66 is provided with a recess which slidably supports a pin 67 carried by the movable stop member 64 so that the member and rod are prevented from rocking movement about the axis of the rod. It will now be evident that when the slide 42 moves forwardly towards the chuck 25 upon the spindle 24, the movable stop member 64 will be engaged by the stop screw 63 aligned therewith when the slide approaches its limit of forward movement. During the remainder of the forward movement of the slide, when non-threading operations are being performed, the stop member 64 will move into engagement with the stop lug 66 thereby positively arresting the forward movement of the slide. This movement of the stop member 64 compresses a coil spring 68, that surrounds the rod 65 between a collar 69 on the rod and a part of the saddle, so that when the stop roll is moved away from the stop plug, upon rearward movement of the turret slide, the stop member 64 is restored to its initial position.

The rod 65 has its right hand end portion, as viewed in the drawings, slidably supported within a bore formed in the saddle 41 and this portion of the rod is provided with an inclined cam surface for cooperation with an inclined cam surface upon a switch actuator 70, the latter being slidably supported in a bore extending perpendicularly with respect to the bore in which the cam rod slides. The end of the switch actuator 70 opposite its cam shaped portion has a pin-like portion of reduced diameter slidably extending through a bushing 71 threaded into the saddle, see Fig. 3. Intermediate the inner end of the bushing 71 and the shoulder between the reduced diameter portion and the main body portion of the switch actuator 70 is disposed a compression spring 72 which normally urges the switch actuator 70 into engagement with the rod 65.

The above-mentioned reduced diameter portion of the switch operator 70 has its outer end positioned adjacent to and in line with the actuating button 73 of an electrical switch, designated AR, and which is supported in a housing 74 secured to the rear side of the saddle 41. It will be apparent, therefore, that each time the slide 42 is moved forwardly to a point where a stop screw 63 engages the stop member 64 and moves the stop rod 65, the switch actuating member 70 will be cammed outwardly, thereby operating the contacts of the switch AR. This operation of the switch AR is effective during threading operations, as will be hereinafter described, to control operation of the machine and especially to effect automatic reversal of the motor 26 at the end of a threading operation. As illustrated, the mechanism is so positioned and adjusted that the switch AR is actuated a short time before the stop member 64 engages the lug 66 as is conventional in automatic stopping and reversing mechanisms. This permits the spindle to coast in its forward direction at the end of a threading operation to thereby prevent injury to the machine tool or the threading tap or die. If the extent of this coasting operation be found to be too short or too great, it may be adjusted by correspondingly adjusting the stop screw 63 so that the latter engages the movable stop member either earlier or later, as the case may be.

The switch box or housing 74 is also provided with a second electrical switch designated AS, the contacts of which are normally open. The actuating button 75 of this switch extends upwardly through an opening in the top of the switch housing 74, the button 75 being positioned to be engaged and depressed by a dog 76 fixed to the side of the turret slide 42 as shown in Fig. 2. The purpose of this switch will be hereinafter apparent in connection with a description of the electrical circuit and the operation of the device.

The separate segmental contacts S1, S2, S3, S4, S5 and S6 of the indexible switch 57 are each provided with a separate conductor, as is also the movable switch arm 61. These conductors extend through a flexible cable or conduit 77 from the housing 55 to the lower portion of the switch housing 74, and from the latter these conductors as well as those for the switches AS and AR then extend through a conduit or duct 78 supported at the rear of the machine, upon the switch box 74 and the pedestal 21 of the apparatus, see Fig. 2. The several conductors are connected with the control means within the headstock, as will hereinafter appear.

As mentioned heretofore, the motor 26 is of the multi-speed type and, in the illustrated embodiment, is shown as being of the type operating at either of two different predetermined speeds depending upon the mode of its energization. Since motors of this type are well known in the art, details thereof need not be described. These two different basic speeds of the motor will hereinafter be referred to as high and low speeds, respectively. In addition to being multi-speed, the motor 26 is of the reversible type so that it may be rotated in either forward or reverse direction, the motor operating at either of its two speeds in either direction of rotation. Since the motor is connected with the spindle 24 through the gearing described with respect to Fig. 6, each speed of the motor, when rotated in either direction, provides two different speeds of the spindle in the corresponding direction of rotation.

In accordance with this invention, the control means provided upon the headstock 23, and generally designated by the reference numeral 79, includes an electrical switch RS having two sets of contacts RS1 and RS2, see Figs. 8, 17 and 19. The contacts RS1 are normally closed while the contacts RS2 are normally open. This switch provides control of energization or deenergization of the motor and hence the cover panel 80 for the control means is provided with indicia marked "Run" and "Stop" at a point adjacent this switch. The control means also includes an electrical switch FS having two sets of contacts FS1 and FS2. Contacts FS1 are normally closed and contacts FS2 are normally open, these contacts respectively controlling the direction of energization of the motor 26 to effect either forward or reverse rotation thereof and hence the cover panel 80 adjacent this switch is provided with indicia "Forward" and "Reverse."

The two speeds of energization of the motor 26 are selectively effected by means of an electrical switch designated HS forming a part of the control means 79. This switch likewise has two sets of contacts HS1 and HS2, the contacts HS1 being normally closed and the contacts HS2 being normally open, with these contacts respectively controlling energization of the motor 26 for operation at high and low speeds. Consequently, the cover panel, adjacent this switch is provided with indicia "High" and "Low." Likewise, the solenoids BG and DG controlling the gearing for the spindle, are, in turn, controlled by an electrical switch BS having two sets of contacts BS1 and BS2. The contacts BS1 are normally closed, while contacts BS2 are normally open, these contacts respectively controlling energization of solenoids DG and BG. Therefore, the cover panel 80 adjacent the switch BS is provided with indicia "Direct" and "Back Gear." In addition to the above-mentioned switches, the control mechanism further includes a switch TS having one pair of normally open contacts. This switch is employed to condition the machine for a tapping operation, as hereinafter described, and therefore the control panel 80 adjacent this switch is provided with an indicia marked "Normal" and "Tap."

As illustrated in the drawings, the control means 79 is contained within a recess in the headstock 23, which recess is closed by the cover panel 80. It will be apparent however that, if desired, the control means may be contained in a separate housing which is attached to the headstock.

Within the recess or housing for the control means 79 there is provided an angular mounting bracket 81 a flange of which is shown, see Fig. 8, as extending substantially vertically and has the previously mentioned switches RS, FS, HS, BS and TS mounted thereon in spaced relationship, this upright portion of the bracket 81 being apertured to permit the actuating buttons, such as 82, of the switches to extend therethrough. Adjacent to, but spaced from and paralled with the bracket 81, is a second bracket 83, and adjacent to the opposite side of the recess, but spaced therefrom, is another mounting bracket 84 which extends parallel with the brackets 81 and 83.

The upright flanges of the brackets 83 and 84 are provided with spaced aligned apertures, the centers of which are aligned respectively with the actuating buttons such as 82 for the switches RS, FS, HS, BS and TS. Slidably supported within the apertures of the brackets 83 and 84 are rods 85, 86, 87, 88, and 89 which extend parallel with each other and have a length such that their outer ends extend beyond the brackets 83 and 84. The lefthand ends of these rods, 85 to 89 inclusive, are adapted to engage and actuate the previously mentioned switches RS, FS, HS, BS and TS, respectively, the bars being normally in engagement with the actuating button such as 82 of these switches but normally exerting no appreciable pressure thereon so that the switch buttons 82 are urged to their outermost position by internal springs, not shown, within the switches. The rods 85 to 89 are preferably substantially circular in cross section, and are provided with axially extending keyways such as 90, see Fig. 10, for cooperation with finger-like projections in the brackets 83, 84 to prevent rotation of the rods. These rods are adapted to be axially moved either manually or by means of solenoids, as hereinafter described, to thereby effect operation of the switches RS, FS, HS, BS and TS and thus control the operation of the machine tool.

The righthand ends of the rods 85, 86, 87 and 88 extend beyond the bracket 84 and through aligned bores in the righthand wall of the recess for the control mechanism, see Fig. 8. The outer ends of these rods 85, 86, 87 and 88 are provided, respectively, with reduced diameter extensions 91, 92, 93 and 94, the outer ends of which are preferably rounded and are located within a recess 95 in the headstock. Within the recess 95 is located a cam drum 96 which is connected with a shaft 97, extending vertically through a bore in the headstock, the upper end of the shaft 97 extending above the top of the headstock. The shaft 97 is rotatable and slidable within the said bore, and the length of the cam drum 96, relative to the length of the recess 95, is such as to permit limited axial movement of the cam drum therein. Preferably the extent of axial movement of the cam drum in either direction is limited by integral bosses such as 98 and 99 provided in the headstock recess.

The portion of the shaft 97 which extends above the headstock is pivoted to a manually operable lever 100 intermediate the ends of the latter. The outer end of this lever is provided with a knob or other hand grip 101, while the inner end of the lever 100 is received by, and adapted to move vertically within, a slot 102 of a member 103 which is secured to, or integral with, a segmental plate 104 disposed concentrically about the shaft 97 with its lower face resting upon a boss 105 of the headstock. A portion of the periphery of this boss 105 is preferably provided with arcuately spaced indicia 106 and the segmental plate 104 is provided with a reference mark or arrow, such as 107, for selective cooperation with these indicia. As shown, the indicia 106 comprise abbreviations representative of various operating conditions of the machine tool and which correspond to different arcuate positions of the cam drum 96. Thus, the indicium "HD" represents high speed of the motor 26 with the gearing positioned for "Direct" operation of the spindle. "LD" represents low speed of the motor and direct gearing of the spindle. "HB" represents high speed of the motor with back gearing of the spindle; "LD" represents low speed of the motor with back gearing of the spindle; and "Auto" represents automatic operation of the machine. It will be apparent from the construction described thus far that, when the handle 101 of the lever 100 is gripped and moved to position the arrow 107 in alignment with one of the indicium 106, the cam drum 96 will be correspondingly rocked or partially rotated to effect a predetermined operation of the machine tool as hereinafter described.

In addition to the above-mentioned partial rotation of the cam drum 96, the latter may also be axially moved and disposed in either of three preselected positions. To facilitate location and retention of the cam drum in each of these axial positions, the shaft 97 is preferably provided with three circumferentially extending grooves or recesses such as 108, which are spaced distances axially of the shaft 97 corresponding with the desired axial positions of the cam drum. The headstock 23 is provided with a spring detent means, generally designated 109, and which may comprise a spring depressed ball adapted to selectively enter into one of the said circumferential grooves or recesses 108 and thereby retain the shaft 97 and the cam drum 96 in one or the other of the three axial positions. This detent readily yields upon application of an axial force on the cam drum shaft to permit axial movement of the drum to another of its preselected positions, axial movement of the shaft 97 and hence of the cam drum being effected by rocking the lever 100 as indicated by broken lines in Fig. 8.

As shown in Fig. 8, the substantially horizontal position of the lever 100 with the detent 109 in the central groove or recess 108 corresponds to the "off" position of the machine tool. When the lever 100 is moved to its upper broken line position, the cam drum 96 is correspondingly moved to its upper broken line position and the machine is then conditioned for running in a reverse direction, as indicated by the abbreviation "Rev." adjacent the upper dotted line position of the lever. At this time the detent 109 will have taken up a position in the lowermost of the grooves 108 retaining the cam drum and the shaft 97 in this position until the lever 100 is again operated. When the cam lever is moved to its lower dotted line position, designated by the abbreviation "For.," the shaft 97 and the cam drum 96 will be moved downwardly until the latter occupies its lower broken line position, the detent 109 then being in the uppermost groove 108. In this latter position of the parts the machine is conditioned for forward rotation of the spindle. It will be apparent that, when the cam drum is in any of its three above-mentioned positions, it may be retained therein by the detent and rotated as previously described to dispose the arrow 107 in alignment with any of the indicia 106.

In order that the above-mentioned movements of the cam drum may exercise the desired controlling functions upon the machine tool, the drum 96 is provided with a plurality of spaced, circumferentially extending cams which are shown as integral projections from the cam drum but which may be formed as separate members secured thereto. As will be seen from Figs. 8, 8a, and 11 through 15, these cams vary both in arcuate length and width in an axial direction in addition to being disposed at different positions upon the cam drum. Thus, the cam 110 has a position and dimensions such that, when the drum is in its "off" position as illustrated in Fig. 8, the cam 110 is in engagement with the outer extension 91 of the rod 85 thereby causing the latter to actuate switch RS. However, when the cam drum is moved axially in either direction the cam 110 is moved from engagement with the extension 91. The circumferential extent of the cam 110 is such, as indicated in Fig. 11, that the cam is adapted to engage and move the extension 91 and hence the rod 85 at all arcuate positions of the drum.

Spaced below the cam 110 is the cam 111 having a width substantially equal to that of the cam 110 but of lesser arcuate extent. This cam is axially positioned on the drum such that when the drum 96 is in the "off" position as indicated in Fig. 8, the cam 111 is disposed below and out of engagement with the extension 92 of the rod 86. However, when the cam drum 96 is moved to its reverse position, that is to its upper broken line position, the cam 111 is in engagement with the extension 92 of the rod 86. The arcuate extent of the cam 111 will be apparent from Fig. 12.

Below the cam 111 are two identical but circumferentially spaced cams 112 and 113 having their arcuate dimensions less than their axial dimensions. These cams are so positioned, angularly of the drum 96, that when the latter is in the position shown in Fig. 8, the cams while circumferentially spaced, have their central portions in the same plane as the center line of the extension 93 on the rod 87 but circumferentially spaced therefrom. The axial extent of each of these cams 112 and 113 is such that a portion of one of the cams will engage the extension 93 for any axial position of the cam drum 96 when the latter is angularly positioned to align either the cam 112 or 113 with the said extension. Below the cams 112 and 113 is a cam 114 adapted to cooperate with the extension 94 on the rod 86. The axial extent of this cam 114 is substantially the same as those of the cams 112 and 113, but it has a greater arcuate dimension than either of these cams, as will be apparent from Fig. 14. Hence, when the drum 96 is rotated to a position that the cam 114 is adjacent the extension 94, this cam will engage and move the extension, operating switch BS, regardless of the axial position of the drum.

Adjacent the lower end of the drum 96 and arcuately spaced therearound so as to be adjacent the righthand edge of the recess 95 when the drum is in its automatic position, is a cam 115 adapted to engage and actuate the switch 116 bearing the legend "Auto." The axial extent of the cam 115 is such that when the cam is circumferentially positioned for actuation of the switch 116, it will actuate the switch regardless of the axial position of the drum.

Adjacent the upper end of the cam drum 96 is a circumferentially extending cam 115a which has a recess adapted to receive the end of rod 153 for a latch or interlock mechanism (hereinafter described) when the cam lever 100 is at the automatic position. This cam has an axial length sufficient to cooperate with the rod 153 in all axial positions of the drum. At all circumferential positions of the lever 100 other than the automatic position, the rod 153 is in engagement with the raised portion of cam 115a.

Fig. 16 is a chart of the various switches RS, FS, HS and BS which are operated for the various selected positions of the cam drum 96 in the different arcuate and axial positions thereof. The axial and arcuate dimensions of the several cams 110, 111, 112, 113, 114, 115 and 115a for effecting these operations will be apparent from Figs. 8, 8a, and 11 through 15, since the radial lines in Figs. 11 through 15 correspond respectively with the indicia 106. Thus, it will be seen that with the lever 100 and the cam drum 96 positioned in the "Off, Auto" positions, as shown in Fig. 8, the cam 110 is in engagement with the extension 91 of the rod 85 so that the latter is moved to the left sufficiently to operate the contacts of the switch RS. Likewise, the cam 115 is in engagement with the actuating button of the switch 116 and operates the latter while the rod 153 is positioned in the recess of cam 115a. The other cams 111, 112, 113 and 114 are out of operative relationship with respect to the corresponding switch operating rods of the mechanism. This condition is represented in the chart constituting Fig. 16 by the presence of the characters "RS, 116" in that block which is in the column marked "Auto" and the row marked "Off."

If the cam drum 96 be rotated to bring the arrow 107 into alignment with the indicium HD while maintaining the handle 100 in the "Off" position, then the drum is not axially shifted so that the switch RS remains operated by means of the cam 110 while the switch 116 is no longer operated by the cam 115 and the rod 153 now engages the raised portion of cam 115a. The other cams remain out of operative relationship with respect to their corresponding switch actuating rods. This condition is represented by the character "RS" in that block of the chart, Fig. 16, which is in the "High Direct" column and the "Off" row. The various switches operated for the other positions of the cam drum can likewise be determined by reference to the chart. Thus, for "High Direct, Reverse" operation the switch FS is operated. This corresponds to an angular position of the cam drum with the arrow 107 aligned with the "HD" indicium and the lever 100 moved to the "Rev." or upper broken line position. This disposes the cam drum 96 in its upward position thus removing the cam 110 from operative relationship with the extension 91 of the rod 85 so that the contacts of switch RS are restored to their normal positions. This axial movement of the cam drum will, however, have brought the cam 111 into cooperative relationship with the extension 92 of the rod 86 so that the switch FS is now operated. The other cams remain out of operative relationship with the cooperating switch actuating rods while rod 153 remains engaged with the raised portion of cam 115a. With the cam drum arcuately in the same position and the handle or lever 100 lowered to the position marked "For.," all of the cams on the cam drum except cam 115a will be out of engagement with the rods and likewise the cam 115 will be out of engagement with the switch 116. Hence, none of the switches are operated as is indicated by the blank space in the chart.

Similarly, it will be apparent that with the cam drum positioned so that the arrow 107 is in alignment with the indicium 106 marked "LD" and with the lever 100 in the upper or reverse position, the switches FS and HS are operated since the cams 111 and 112 are operative to actuate the rods 86, 87 and thereby actuate the switches FS and HS. At the same angular position of the cam drum but with the lever 100 at its intermediate or "Off" position, cam 110 and cam 112 are effective to operate switches RS and HS. At the same angular position of the cam drum but with the lever 100 at its lower or forward position only the cams 112 and 115a are operative and hence only the switch HS is actuated.

When the cam drum 96 has been rotated to bring the arrow 107 into alignment with the indicium HB and with the lever 100 in its upper or reverse position, cams 111 and 114 are effective to operate the switches FS and BS. At the same angular position of the cam drum but with the lever 100 in the intermediate position only the cams 110, 114, and 115a are operative and hence only switches RS and BS are actuated. Likewise, at the same angular position of the drum but with the lever 100 at the lower or forward position only the cams 114 and 115a are operative and hence only the switch BS is actuated.

It will also be apparent that, with the cam drum positioned so that the arrow 107 is in alignment with the indicium LB, and with the lever 100 in its upper position, cams 111, 113 and 114 are operative to actuate the corresponding switch operating rods 85, 87, and 88 and hence operate the switches FS, HS and BS. At the same angular position of the drum and with the lever 100 in its intermediate or "Off" position, cams 110, 113 and 114 are operative to effect actuation of switches RS, HS and BS. At the same angular position of the drum but with the lever 100 in its lowermost position, cams 113 and 114 are operative to actuate switches HS and BS. As noted before, the switch 116 is actuated by the cam 115 whenever the cam drum is arcuately positioned with the arrow 107 in alignment with the indicium marked "Auto," regardless of the vertical position of the lever 100; that is, whether the latter be in its reverse, off, or forward positions. Likewise, rod 153 can enter the recess of cam 115a only in the "Auto." position of the lever 100. The manner in which these several switch operations control the operation of the machine will hereinafter become apparent from the description of the electrical circuit and of the mode of operation of the device.

In addition to manual actuation of the switch operating rods 85, 86, 87 and 88, as mentioned above, these rods, as well as the rod 89, may be selectively moved by solenoids in accordance with the indexed position of the turret, the position of the turret slide and manually preselected conditions. For this purpose, the control means 79 is provided with a second set of spaced parallel extending rods, this second set of rods being angularly disposed with respect to the first set of rods, 85 to 89. As shown in the drawings, the two sets of rods extend at substantially right angles with respect to each other, with the first set of rods below the second set of rods. To support this second set of rods the recess for the control means is provided with a pair of spaced, parallel extending bracket members 117 and 118 located respectively below the rod 89 and above the rod 85 with the upper flanges of these brackets 117, 118 provided with a plurality of aligned openings.

Spaced from the bracket member 117 and extending parallel therewith adjacent the lower side of the recess of the control mechanism is another mounting bracket 119. The flange of this mounting bracket 119 supports a plurality of solenoids 1S, 2S, 3S, 4S, 5S, 6S, SS and TRS. These solenoids are preferably of the rotatable armature type and are so mounted as to have the armature of each concentric with one of the previously mentioned openings through the flange of the bracket 117. Connected with the armature of each of these solenoids and extending through the aligned opening in the bracket member 117 is an actuating shaft or rod 120, 121, 122, 123, 124, 125, 126, 127, respectively. These actuating shafts are each adapted, when rotated by operation of the corresponding solenoid, to effect movement of one or more of the bars such as 85, 86, 87, 88 and 89 in accordance with preselected operative relationships as determined and selected by the operator for a given set of machining operations. Since the construction of the mechanism by which this interconnection is effected is substantially the same for each of the solenoids and its cooperating actuating rod, description thereof will be restricted to one of these, it being understood that each of the others is made in the same manner except as specifically noted.

For purposes of example, the shaft 125 and its associated mechanism has been selected for description as representative of all the similarly constructed parts. It will be seen that this shaft is surrounded by a sleeve 128 that is freely rotatable thereupon, see Figs. 8 and 9, this sleeve 128 being prevented from axial displacement relative to the shaft or rod such as 125 by any suitable means. The sleeve 128 has a plurality of axially slidable collar members 129a, 129b, 129c, 129d and 129e mounted thereon, there being one such collar member for each of the horizontally extending rods such as 85 to 89. The collar members 129a to 129e are adapted to be rotated with the sleeve 128 by virtue of a longitudinally extending key 130 provided in the sleeve with which keyways provided in the collars slidably cooperate. The collars, such as 129a and 129e, are each provided with a downwardly extending projection or finger 131 which may be integral with or formed as a pin connected in the corresponding collar. These pins or fingers are each adapted to be selectively positionable in separate slots such as 132 provided in the upper sides of the rods such as 85 to 89 located therebelow, see Fig. 10. The collars may also be selectively moved to individually dispose the pin or projections 131 out of engagement with such slots in the rods, such as 85 to 89, as will also be evident from Fig. 10.

In order to effect actuation of the collars in the manner just described, each collar is provided with an upwardly extending projection or portion 133 which may be integral with or a separate pin connected to the collar which may be engaged and moved by the fingers of the operator. As shown in Figs. 7 and 10, the cover plate 80 for the control mechanism is provided with a plurality of spaced openings 134 arranged in rows and columns with each column substantially aligned with a sleeve 128 thereunder and each row disposed substantially above one of the transversely extending rods such as 85 to 89, inclusive. The pins 133 extend upwardly through these openings 134 sufficiently to enable convenient gripping thereof for movement of the collars.

A means is provided to retain each of the collars in either of the two positions thereof, namely, with the pins 131 in or out of the slots 132 in the transverse rods such as 85 to 89. In the illustrated embodiment, this means comprises a ball detent, such as 135, mounted in each of the collars and adapted to selectively engage in either of two axially spaced circumferentially extending grooves such as 136 or 137 in the sleeve 128 adjacent each slot 132 in the rod, such as 89, therebelow. In one of these positions, for example with the ball detent in the groove 136, the pin 131 will be disposed in the slot or grooves such as 132 in the transverse rod such as 89. In the other position, namely with the detent 135 engaged in the groove 137, the collar 129e is so positioned that its pin 131 is no longer disposed within the slot or groove, such as 132, in the corresponding transversely extending rod. The collars are moved between either of these positions just mentioned by manually grasping the pin such as 133 and moving the latter axially of the sleeve. It will be apparent that instead of ball detents such as 135 other means may be employed for retaining the collar at a selected position upon the corresponding sleeve. Also suitable shields or the like may be affixed to the pins 133 beneath the plate 80 to provide a closure for the openings thereof, if desired.

Adjacent the lefthand side of the cover plate 80 are legends in alignment with the rows of openings 134 which legends designate the operation of the machine when the collars are aligned therewith. These legends are arranged in pairs, one pair for each of the openings and each legend of each pair corresponding with one of the two selected positions for the collars in that row. The columns of the openings 134, which are over the rods or shafts 120, 121, 122, 123, 124, 125, 126 and 127, are designated as Face No. 1, 2, 3, 4, 5, 6, Start, and Tap Reverse, respectively.

Each of the sleeves 128 is provided with a coil spring 138 surrounding a portion of the sleeve with one end of the spring connected to the sleeve and the other end of the spring connected to the bracket 118. Consequently, each of the sleeves 128 is normally urged to the position substantially as shown in Figs. 8 and 10. The outer end of each of the sleves 128 extends through and is journalled in an opening in the bracket 118. Attached to the outer end of each of the sleeves corresponding with the solenoids 1S, 2S, 3S, 4S, 5S and 6S is a disk 139 provided with an arcuately extending notch or recess 140, see Fig. 9. The sleeves 128 associated with the solenoids SS and TRS likewise are provided with disks on the outer ends thereof for rotation therewith. These latter disks, designated 141, are each provided with two arcuately extending recesses or notches 142 and 143 which are substantially diametrically opposite each other.

The shafts or rods 120, 121, 122, 123, 124 and 125 have their outer ends extending beyond the disks 139 and this extended portion of each of these shafts is provided with a radially extending arm 144 which is connected with the corresponding shaft to rotate therewith. Pivoted adjacent the outer end of each of the arms 144 is a link 145 provided adjacent its lower end with a forwardly extending pin 146. Each arm 145 is adapted to extend downwardly, as viewed in Fig. 9, with the pin 146 received in the recess 140 of the corresponding disks 139 when the associated solenoid, such as 6S, is deenergized. A spring, not shown, may be provided, if desired, to assist the movement of arm 145 in disposing pin 146 in the recess 140. The construction is such that when any of the solenoids 1S through 6S is energized, the corresponding arm 144 is rotated and, since the pin 146 is within the recess 140, the pin engages the radial shoulder 147 so that the disk 139 is thereby correspondingly rotated in a clockwise direction, as viewed in Fig. 9.

The rotation of a disk 139 causes a corresponding rotation of the attached sleeve 128 and of each of the collars such as 129a to 129e positioned thereon. The rotation of the collars 129a to 129e in turn effects axial movement of those switch actuating rods 85 to 89 with which the pins 131 have been engaged. That is to say, if a collar has been positioned with its pin 131 within a recess or groove such as 132 of an associated rod 85 to 89, the rotation of the disk 139 and of the collar moves the rod to the left as viewed in the drawings, thereby operating the switch which is in alignment therewith. Any of the collars such as 129a to 129e which has been located in its other position, namely with the pin 131 out of the groove such as 132, will rock without imparting movement to the adjacent rod such as 85 or the like so that the corresponding switch in alignment with that rod is not actuated.

The shafts 126 and 127 for the solenoids SS and TRS also extend beyond the outer face of the disks such as 141. These extending portions of the shafts 126, 127 are each provided with a radially extending arm such as 149, see Fig. 9. Each of the radially extending arms 149 is provided adjacent the end thereof with a forwardly projecting pin 150 which is received within the arcuate opening or recess 142 of the corresponding disk 141. The construction is such that when the solenoids SS or TRS are energized the corresponding arm 149 is rotated in a clockwise direction so that the pin 150 engages the shoulder 151 of the recess 142, thereby also rotating the disk 141 in a clockwise direction against the force of the spring such as 138.

Figure 9:
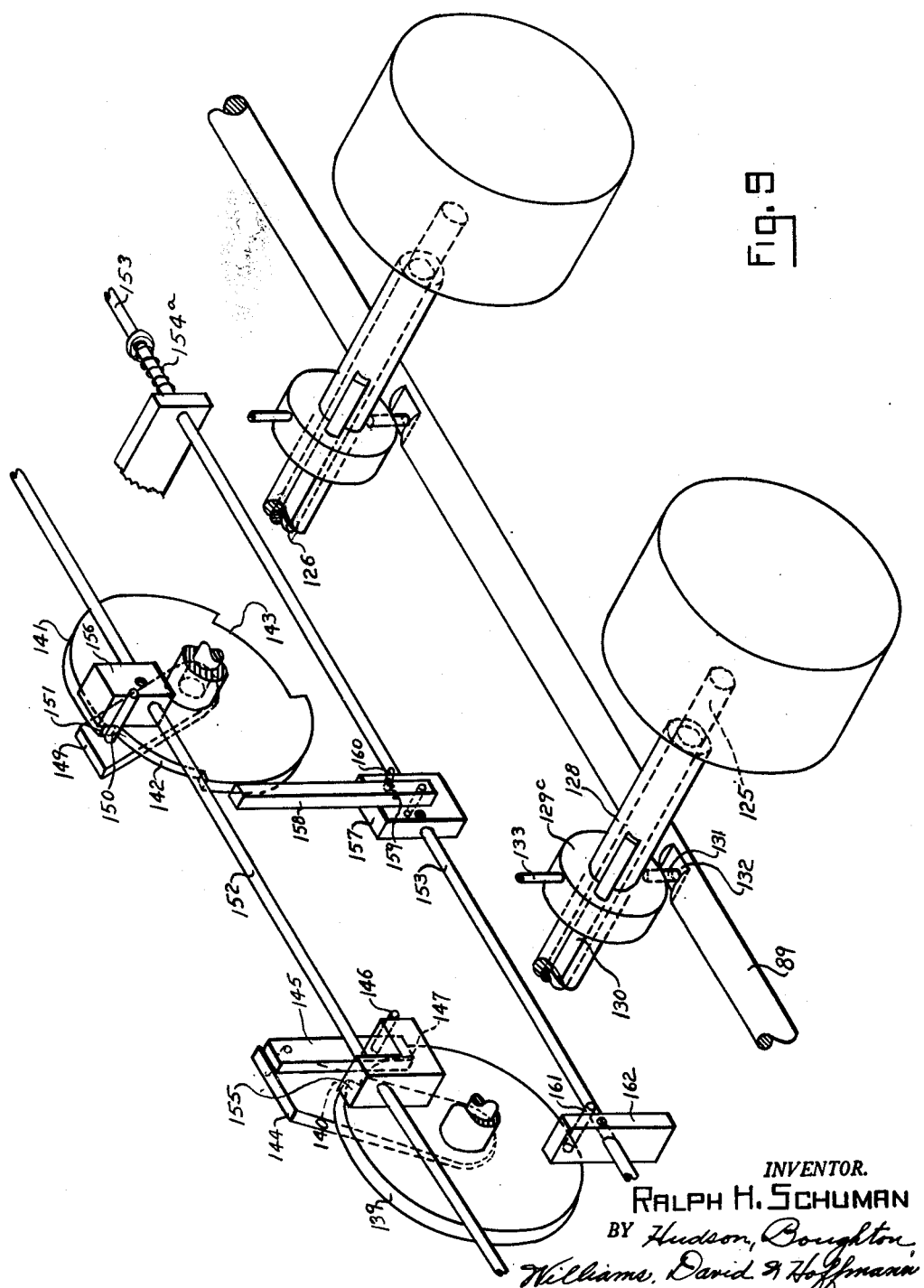
Fig. 9 is an enlarged fragmentary perspective view illustrating a portion of the control means shown in Fig. 7 and of the interlock mechanism therefor.

An interlock is provided between the two mechanisms operated by the solenoids SS and TRS and those operated by the solenoids 1S, 2S, 3S, 4S, 5S and 6S. As shown in Figs. 8 and 9, this interlock comprises two spaced rods 152 and 153 extending in parallel relationship transversely of the control mechanism adjacent the disks 139, 141 and slidably supported at their ends in the bracket 83 and the righthand side wall of the recess or housing for the control mechanism. The rod 152 extends above the sleeves 128 while the rod 153 extends below the sleeves 128, the rods being normally urged in opposite directions by means of compression springs such as 154 and 154a, respectively, see Figs. 8 and 9, the force of which is directed so that the rod 152 is normally urged towards the left as viewed in Fig. 9 and the rod 153 to the right as viewed in the same figure.

Connected upon the rod 152 adjacent each of the disks 139 is a substantially L-shaped member 155, the lower righthand face of which, as viewed in Fig. 9, is adapted to engage the pin such as 146 and displace the latter from the recess 140 when the rod 152 is moved to the right against the force of the spring. The members such as 155 are, however, normally retained by the force of the compression spring 154 at a position such that the pins 146 may engage within the recesses 140 and operate against the shoulders 147 for actuation of a disk 139 when the corresponding solenoid is energized. Also mounted upon the rod 152 and connected to move therewith are blocks 156. These blocks are disposed adjacent the disks 141 and pins 150 in positions such that one or the other of the blocks is engaged by a pin 150 when the latter rotates its disk 141 upon energization of the corresponding solenoid SS or TRS. This movement of a block 156 acts through the rod 152 to move the members 155 thereby disengaging the pins 146 from the disks 139 so that energization of the solenoids such as 1S to 6S cannot effect a rotation of the disks 139 nor of the sleeves and collars connected therewith and, if these solenoids are already energized, the corresponding actuated sleeves and collars are returned to their initial positions by the springs 138.

The rod 153 is provided with a pair of spaced blocks such as 157, one each of which is mounted adjacent to the lefthand side of each of the disks 141, see Fig. 9. These blocks 157 are connected to move with the rod 153 and each has an upwardly extending arm 158 pivoted thereto. A compression spring 159, having one end connected to the block 157 and the other end to the arm 158, normally urges the arm 158 in a clockwise direction. Movement in this direction is limited by a pin 160 carried by the block 157 so that the arm 158 is normally maintained in an upright position but may rock slightly in a counterclockwise direction against the action of the spring 159. The rod 153, blocks 157, and arms 158 are so located that each arm is adapted to ride upon the periphery of one of the disks 141, the rod 153 and attached arms being urged to this position by the spring acting upon the rod and by the springs 159 acting upon the arms. These arms are adapted to have their upper ends drop into notches such as 143 provided upon the disks 141 when the latter have been rocked as a result of energization of the solenoids SS or TRS and the recess on cam 115a of cam drum 96 is aligned with the rod 153 as the result of placing lever 100 in its "auto" position. When the arm such as 158 thus drops into the notch 143, it locks or latches the said disk 141 holding the latter in operated position even though the corresponding solenoids such as SS or TRS have been deenergized.

It will now be apparent that upon energization of either the solenoids SS or TRS the corresponding disk 141 is rocked about its axis by action of the pin such as 150 carried by the arm 149 connected with the armature of the solenoid. The pin 150 during this movement engages the block 156 thus moving the rod 152 so that the members 155 disengage the pins 146 from the disks 139 allowing each of the latter to return to its initial position under the action of the corresponding spring 138. The actuated disk 141 is held in its operated position by the arm 158 engaging in the notch 143 so that the disk 141 does not return to its initial position when the corresponding solenoid is deenergized. However, deenergization of the solenoid, such as SS or TRS, removes the rotative force applied to the arm 149 so that the spring, such as 154, is effective to pull the rod 152 to the left thereby removing the members 155 from engagement with the pins such as 146 so that the latter may now again drop into the arcuate recesses such as 140 in preparation for actuation of a disk 139 when the corresponding one of the solenoids 1S to 6S is energized.

In addition to the above mentioned features of construction, each of the disks 139 is provided with a pin 161 which extends inwardly adjacent the rod 153, these pins being engageable with block-like members 162 mounted for movement with the rod 153 adjacent each of the disks 139. Hence, each time one of the solenoids 1S to 6S is energized, with resulting rotation of the corresponding disk 139, the pin 161 thereon engages the adjacent block 162 moving the latter to the left and thereby disengaging the latch arms 158 from the disks such as 141 so that the latter, if actuated, may return to their initial positions under the action of the corresponding springs 138. The latch arms 158 may also be released from the disks 141, when the machine is to be manually controlled, by action of cam 115a on the cam drum 96 which moves the rod 153 to the left when the lever 100 is moved to an arcuate position other than that designated "Auto."

The electrical connections for the motor 26 and the manner in which its operation and the operation of the back gears are controlled by the previously described cam drum, solenoids and switches is illustrated in Figs. 17 and 19. As shown therein, electrical power for the machine is supplied from a source of 3-phase alternating current through power supply lines P1, P2 and P3. The motor is selectively connectible with these power supply lines through the operation of forward and reverse contactors F and R, respectively, and high and low speed contactors H and L respectively. Thus, the high speed connections for the motor 26 may be connected to the supply lines P1, P2 and P3 through the contacts H1, H2 and H3 of the contactor H through closing of the contacts F1, F2 and F3 of the forward contactor F, or the high speed connections of the motor may be connected for reverse energization of the motor through the contacts H1, H2 and H3 and the contacts R1, R2, and R3 of the reverse contactor R. Likewise, the low speed connections for the motor 26 may be connected with the supply lines P1, P2 and P3 through closing of the contacts L1, L2 and L3 of the contactor L, and either closing of the contacts F1, F2 and F3 of the forward contactor F or closing of the contacts R1, R2 and R3 of the reverse contactor R. Hence, the motor may be energized in a manner effecting rotation thereof at either high or low speed and in either the forward or reverse direction.

The power supply lines P1 and P3 are also connected to the primary of a transformer 163, the secondary of which is connected to wires 164 and 165 for the control circuit of the machine.

In this control circuit the wire 164 is connected by a wire 166 to one side of an on-off switch 167, see also Fig. 8, the other side of this switch 167 being connected through the normally closed contacts RS1 of the switch RS to a wire 168. The wire 168 connects with two parallel circuits, one of which extends through the normally closed contacts FS1 of the switch FS to a wire 169 which is connected with the normally open contacts FR1 of a relay FR. The contacts FR1 are connected in series with the normally closed contacts R4 of the reverse contactor R and the circuit is completed from these latter contacts through the coil of the forward contactor F to the wire 165. The coil of the relay FR is connected to the wires 169 and 165 and hence is bridged about the contacts FR1, R4 and the coil of the contactor F. The other branch of the parallel circuit connected to the wire 168 extends to the normally open contacts FS2 of switch FS and from the latter through a wire 170 to the normally open contacts RR1 of a relay RR. The circuit continues through the normally closed contacts F4 of the forward contactor F and the coil of the reverse contactor R to the wire 165. The coil of the reverse relay RR is connected between the wires 170 and 165 and hence is bridged about the contacts RR1, F4 and the coil of the contactor R.

In order to effect rapid stopping of the motor 26 when the latter is deenergized or its direction of energization reversed, a conventional plugging switch generally designated PS is employed. This plugging switch is of well-known construction and does not, per se, form any part of this invention so that the details thereof are not herein illustrated. One form of suitable switch may, for example, be similar to that disclosed in Clark Patent 2,405,686 issued August 13, 1946. For the purpose of this disclosure, it is sufficient to note that such a switch operates, during deceleration of the motor, in a manner to momentarily effect energization of the motor 26 for rotation in the opposite direction from that in which it is then rotating, thereby rapidly decelerating the latter. Therefore, such a switch PS may be schematically illustrated as comprising a movable contact 171 which is adapted to momentarily engage the contacts such as 172 or 173 during deceleration of the motor 26. The movable contact 171 is connected to the wires 174 and 175 which are respectively connected with the wire 164 through the normally open contacts FR2 and RR2 of the forward relay and reverse relay respectively.

The contactor H for effecting high speed operation of the motor 26 has its coil connected between the wires 164 and 165 in series with the normally closed contacts HS1 of switch HS and the normally closed contacts L4 of the low speed contactor L. The coil of the low speed contactor L is likewise connected between the wires 164, 165 through the normally open contacts HS2 of switch HS and the normally closed contacts H4 of the high speed contactor H. The solenoid DG, controlling "direct" drive of the spindle, is connected between the wires 164, 165 through the normally closed contacts BS1 of the switch BS. The solenoid BG, controlling back gearing of the spindle, is connected between the wires 164 and 165 through the normally open contacts BS2 of switch BS. The relationships of these several relay and contactor operated contacts with respect to their operating coils will be further understood from an inspection of Fig. 18 in which the operating coil of each relay or contactor is arranged in vertical alignment with the contacts operated thereby, with the several contacts and coils being horizontally aligned with their corresponding positions in Fig. 17.

The wire 164 is connectible with a wire 176 through closing of the normally open contacts of the switch 116 so that the wire 176 becomes one of the main power supply leads for a portion of the control circuit. Thus, the solenoids 1S, 2S, 3S, 4S, 5S and 6S each have one terminal connected to the wire 165 with the other terminal connected to the corresponding conductive segments S1, S2, S3, S4, S5 and S6, respectively, of the indexible switch mechanism 57, and the wire 176 is connected with the moving arm 61 of the indexible switch 57. These connections are indicated in Figs. 17 and 19, for convenience of schematic illustration, by showing the movable arm and stationary segments as each comprising normally open contacts, designated S1, S2, S3, S4, S5 and S6 in accordance with the corresponding conductive segment of this indexible switch.

The switch AS, which is actuated by the dog 76 on the turret slide, has one terminal connected to the wire 176, the other terminal being connected to one terminal of the normally open contacts RS2 of the switch RS, the second terminal of the contacts RS2 being in turn connected to the solenoid SS with the latter having its circuit completed to the wire 165. Consequently, solenoid SS is in series with the switch AS and the contacts RS2. Likewise, the solenoid TRS is connected in a series circuit extending between the wires 176 and 165 by means of a series connection with the normally open contacts of the switch AR, which is controlled by the stop roll, and the normally open contacts of the switch TS.

The manner in which the several switches, relays, and solenoids operate to automatically control the machine in accordance with preliminary setting of the control mechanism 79, or in accordance with actuation of the manual control lever 109 can best be understood from a description of the operation of the device for machining a specific type workpiece, it being understood that while a specific type of workpiece is hereinafter referred to this is by way of illustration and that the machine may be correspondingly set up and operated for machining workpieces of other types and configurations.

Let it be assumed that the workpiece to be machined is to have a cylindrical shank and an attached enlarged cylindrical portion in the nature of a flange, that the enlarged portion is to have a central opening communicating with an enlarged central bore in the shank, and that the inner portion of the enlarged bore is to have a lefthand thread. Furthermore, let it be assumed that the reduced diameter shank is to be formed by first roughing and then finishing and that the counterbore or enlarged bore in the shank is to be formed by first drilling and then reaming.

*Automatic operation*

In setting up the machine for automatic operation to produce a workpiece of the type mentioned above, the operator will set the several collars such as 129a, etc., by selectively moving the pins 133 thereof into alignment with the legends upon the cover plate 80 of the control mechanism 78 representative of the desired functioning of the machine for each operation to be performed. Thus, if it be assumed that the first face of the turret is in operative position with respect to the spindle of the machine and that this represents the work loading position, the collars for the No. 1 face will be positioned so that the pins 133 thereof align respectively with the legends "Stop," "Forward," "High," "Back Gear," and "Normal." Likewise, each of the other collars of the control mechanism will be adjusted so that its pin 133 aligns with the appropriate legend or indicium for the desired operation, the positions of the collars for producing the assumed workpiece being represented in Fig. 7. Therefore, since the first operation will normally be a roughing cut and which will be effected while the No. 1 face of the turret is positioned in alignment with the spindle, and since this face of the turret is also used for loading so that the spindle is initially at rest, the speeds and direction of rotation of the spindle for the roughing cut are determined by the setting of the collars associated with the rod 126 and solenoid SS, this column of collars being designated by the legend "Start" upon the control box. Hence, the pins 133 in the "Start" column of the control mechanism are set at positions aligned with the legends "Run," "Forward," "Low," "Direct," and "Normal." This indicates that the motor 26 will be energized so that it runs in a forward direction at a low speed without back gearing and that the operation is normal, that is, not a tapping operation.

The second face of the turret is to be utilized for the finishing cut, in producing the assumed workpiece, and hence the pins 133 on the collars associated with the shaft 121, in the column designated "Face No. 2," are set opposite the legends, "Run," "Forward," "High," "Direct," and "Normal," indicating that the motor will at this time be operating at high speed in a forward direction without back gearing and that the operation is not a tapping operation.

The third face of the turret is to be employed with a tool which will effect drilling both of the opening through the flange and of the enlarged opening which is to be tapped in the shank portion of the workpiece. Therefore, the pins 133 for the corresponding collars upon the rod or shaft 122, in the column designated "Face No. 3," are set in alignment with the legends "Run," "Forward," "High," "Back Gear," and "Normal," indicating that during this operation the spindle will be driven at the high speed of the motor in a forward direction of rotation through the back gearing and that the operation is not a tapping operation.

The fourth face of the turret is to be used to ream the outer portion of the previously drilled, enlarged diameter, hole in the shank of the workpiece and hence the pins 131 upon the collars of the rod or shaft 123, in the column designated "Face No. 4," are set in alignment with the legends "Run," "Forward," "Low," "Back Gear," and "Normal," indicating that the machine is to operate with the spindle driven in the forward direction at low speed of the motor through the back gearing and that the operation is not a tapping operation.

The fifth face of the turret is to be used for tapping the inner portion of the enlarged opening in the shank of the workpiece and therefore the pins 133 for the corresponding collars upon the rod or shaft 124, in the column designated "Face No. 5," are set at positions in alignment with the legends "Run," "Reverse," "Low," "Back Gear" and "Tap," indicative of the fact that the spindle will be rotated in the reverse direction, by reverse rotation of the motor, at the low speed of the latter and that back gearing is to be utilized in a tapping operation. The collars associated with the shaft or rod 127 should also be set so that their pins 133, in the column designated "Tap Reverse" are in alignment with the legends "Run," "Forward," "High," "Back Gear" and "Normal." The function of this setting is to effect reversal of rotation of the motor, and hence of the spindle, at the end of the tapping operation to permit removal of the tap. The removal may, of course, be effected at high speed so that it is desirable to energize the motor for high speed operation to speed the withdrawal. Obviously, the back gearing need not be employed at this time but, since the spindle was back geared during the tapping, and is to be used in the next operation which is the roughing cut on a new workpiece, the back gears may be used in the tap withdrawal to obviate unnecessary shifting of parts. In accordance with the assumed example, the tapping is being effected for a lefthand thread and hence the tapping operation is effected by reverse rotation of the motor. Therefore, removal of the tap is effected by forward rotation of the motor. Of course, if a righthand thread were to be formed, tapping would be effected by forward rotation of the motor and removal of the tap would be effected by reverse rotation of the motor.

The sixth face of the turret may be left open, or unused, since in the assumed workpiece no further operations are to be performed. Hence, it is desirable that the spindle shall come to rest when this face of turret is reached. In order to prevent unnecessary actuation of switches and parts of the mechanism, this face is set up in accordance with the operations of the machine which would be performed on the immediately preceding operation, with the exception that in the previous operation the motor will be running where as now the motor is to be stopped. Therefore, the pins 133 for the collars associated with the shaft or rod 125, in the column designated "Face No. 6," have the same settings as those on the rod 127, in the column designated "Tap Reverse," and which control removal of the tap from the workpiece, except that the collar 129a for Face No. 6 is set opposite "Stop." In other words, the collars for Face No. 6 are set up so that the pins 133 are in alignment with the legends "Stop," "Forward," "High," "Back Gear," and "Normal."

With the collars thus set, the lever 100 is then moved so that the arrow 107 is in alignment with the legend "Auto" and the lever is then moved either upwardly or downwardly to either the "For." or "Rev." position, it being immaterial which is utilized since, with reference to Fig. 16, it will be seen that in either of these positions the recess of cam 115a is aligned with rod 153 and only the switch 116 is actuated, the various other cams upon the cam drum 96 then being out of engagement with the horizontally extending switch actuating rods such as 85, 86, 87 and 88. The faces of the turret are provided with the necessary tools for performing each of the above mentioned operations and a workpiece is secured in the chuck 25 of the spindle 24, the turret being disposed near the end of its rearwardmost position to facilitate the positioning of the tools and chucking of the workpiece, the turret not being moved sufficiently rearwardly, however, to cause indexing of the turret.

The "off-on" switch 167 is then moved to "on" position and the turnstile 45 is operated to bring the turret slide forwardly to effect engagement of the tool on the No. 1 face of the turret with the workpiece. Since the turret has its No. 1 face in operative position, the indexible switch 57 has the movable arm 61 thereof in engagement with the conductive segment S1 so that the solenoid IS is energized, thereby rocking the rod or shaft 120. This rocking movement is transmitted through the arm 144, link 145 and pin 146 to the disk 139 since the latch release member 155 will be held, by the spring 154, out of engagement with respect to the pin 146. Consequently, the pin 146 is engaged with the shoulder 147 and rotates the disk 139 with the attached sleeve 128 thereby rocking the collars such as 129a to 129e which are keyed to this sleeve. This partial rotation of the disk 139 causes the pin 161 to engage the member 162 on the shaft or rod 153 thereby moving the latch arms such as 158 to the left as viewed in Fig. 9 thereby releasing any of the disks 141 which may have been latched in a previous operation.

The rocking of the shaft 120 and of the collars as above mentioned causes those collars which have been positioned in cooperative relationship with the switch actuating rods therebelow to move these rods to the left as viewed in Fig. 8. Thus, for the example chosen, the rods 85 and 88 will be moved to the left actuating the aligned switches RS and BS respectively. Actuation of the switch RS opens its normally closed contacts RS1 and closes its normally open contacts RS2. The opening of the contacts RS1 opens the circuit from the wire 164 through the "on-off" switch 167 to the forward and reverse contactors F and R so that the motor 26 is not immediately energized. The operation of the switch BS has opened the normally closed contacts BS1 and closed the normally open contacts BS2. This prevents energization of the solenoid DG and effects energization of the solenoid BG so that the spindle is connected to the motor through the back gears.

As the operator moves the turret forwardly by actuation of the turnstile 45, the dog 76 on the turret slide engages and actuates the switch AS as the dog moves therepast. This momentary closing of the switch AS completes a circuit from the wire 164 through the now closed switch 116 to the wire 176, the circuit being completed through the now closed contacts AS, and the closed contacts RS2, to and through the solenoid SS to the wire 165. The resulting energization of the solenoid SS rotates the shaft or rod 126 and hence the arm 149 so that the pin 150 partially rotates the corresponding disk 141. During this rotation the pin 150 on the arm 149 engages the block 156 on the rod 152 moving the latter to the right, thereby causing the member 155 to disengage the pin 146 from the shoulder 147 of the disk 139 which is associated with the rod or shaft 120. Consequently, the disk 139, sleeve 128, and the collars thereon associated with the rod or shaft 120 now return to their initial positions under the action of the spring 138 associated therewith even though the solenoid IS remains energized. This return of the disk 139 moves the pin 161 from engagement with the block 162 on the rod 153 so that the latter is now moved by its return spring 154a to the right, as viewed in Fig. 9, this movement being permitted by the recess in cam 115a which is positioned in alignment with the end of rod 153. This allows the latch bar 158 to ride on the periphery of the disk 141, as the latter is being rotated, and to drop into the notch 143 so as to hold the disk 141 latched in its operative position after the solenoid SS is deenergized by movement of the turret past the switch AS.

The rotation of the disk 141, as just mentioned, and the latching thereof has, of course, effected rocking movement of the sleeve attached thereto and of the collars carried thereby. In view of the initial selected positions of these collars, only the switch actuating rod 87 is moved to the left thereby operating the switch HS. Moreover, the release of the disk 139, returning the collars thereon to their initial positions, has allowed the previously actuated rods 85 and 88 to be returned to their initial positions by the internal springs in the switches RS and BS so that the contacts of these switches are restored to their normal positions. Therefore, the contacts RS1 of switch RS are now closed and the contacts RS2 are now open. The opening of the latter contacts has no effect at this time since the solenoid SS was previously deenergized as the turret passed the AS switch, it being remembered, however, that the corresponding disk 141 remains latched in position so that the switch HS remains operated.

It will be apparent that a circuit is now completed from the wire 164 through the off-on switch 167, contacts RS1, the normally closed contacts FS1, to and through the relay FR, the circuit being completed to the wire 165. Energization of the relay FR closes its normally open contacts FR1 and FR2. Closing of the contacts FR1 completes a circuit therethrough and through the normally closed contacts R4 of the reverse contactor R to the coil of the forward contactor F, the circuit being completed therethrough to the wire 165. Therefore, the forward contactor F is now energized closing its normally open contacts F1, F2, F3 and opening its normally closed contacts F4. The operation of switch HS has opened its normally closed contacts HS1 and closed its normally open contacts HS2. Hence a circuit is completed from the wire 164 through the normally closed contacts H4 to and through the coil of the low speed contactor L to the wire 165. Energization of the low speed contactor closes its normally open contacts L1, L2, L3 and opens its normally closed contacts L4. The motor 26 is therefore energized through the contacts F1, F2, F3, and L1, L2, L3 for rotation in a forward direction at a low speed, while the contacts F4 and L4 provide against improper energization of the motor in a direction tending to effect rotation in the reverse direction and/or at high speed. The release of the switch BS with the consequent closing of the contacts BS1 and opening of the contacts BS2 has energized solenoid DG and deenergized solenoid BG so that the clutch 35 is shifted, thus connecting the spindle for "direct" driving through the gears 32 and 34.

The spindle 24 is therefore running in a forward direction at low speed with direct gearing and, hence, as the turret is advanced by the turnstile, the tool carried upon the No. 1 face of the turret effects a roughing cut upon the workpiece until the corresponding stop screw 63 engages the stop member 64 and forces the latter against the stationary lug 66. This operation will have closed the switch AR but closing of the latter has no effect at this time since the contacts of switch TS are open, stopping of the turret advance being effected by positive metal-to-metal contact of the stop screw 63, stop member 64 and stationary lug 66. The operator then reverses the direction of rotation of the turnstile, thereby moving the turret slide backwardly to its extreme rear position. During this reverse movement the momentary operation of the switch AS, as the dog 76 passes thereover, has no effect upon the circuit since at this time the contacts RS2 are open.

When the turret slide reaches its extreme rear position, the conventional indexing mechanism operates to index the turret and bring the No. 2 face thereof into operative relationship with the spindle. This indexing movement of the turret also actuates the indexible switch 57 thereby moving the rotating arm 61 to bring the latter into engagement with the contact S2, the indexing movement likewise having brought the next succeeding stop screw 63 into proper alignment with the stop 64 by the simultaneous indexing of the stop roll. The indexing of the indexible switch, as just mentioned, completes a circuit therethrough energizing the solenoid 2S. Energization of the solenoid 2S causes rotation of its arm 144, and hence of the link 145, so that the pin 146 engages and actuates the associated disk 139, it being remembered that the solenoid SS is deenergized so that the block 156 and the stop 155 have moved to their initial positions allowing the pin 146 to engage the shoulder 147 of the disk 139. As the disk 139 is thus rotated, the pin 161 thereon contacts the stop block 162 pulling the rod 153 to the left, as viewed in Fig. 9, thereby releasing the latch bar 158 from the notch 143 of the disk 141 so that the latter returns to its initial position under the action of its spring 138. This allows the switch actuating rod 87 to be restored to its initial position by the internal spring of switch HS so that the contacts of the latter are restored to their initial positions.

The rotation of the disk 139 associated with solenoid 2S has effected rotation of the attached sleeve 128 and the collars 129a, etc., thereon. However, since these collars were all initially positioned out of alignment with the corresponding switch actuating rods 85 to 89, the switches RS, FS, HS, BS and TS are left in their initial positions. Therefore, the circuit through the forward contactor F and the relay FR remains completed so that the forward contactor F remains energized holding its contacts F1, F2, F3 closed and its contacts F4 open. The restoral of the contacts of switch HS to their initial positions closes contacts HS1 and opens contacts HS2. Opening of the latter contacts deenergizes the low speed contactor L so that its contacts L1, L2, L3 are opened and its contacts L4 are closed. Substantially simultaneously, the now closed contacts HS1 complete a circuit energizing the high speed contactor H, thereby closing the contacts H1, H2, H3 of this contactor and opening the contacts H4.

Consequently, the motor 26 is now energized for rotation in a forward direction at high speed, the contacts H4 preventing improper energization of the low speed contactor. Since the switch BS was not operated, the spindle remains connected for direct drive without back gearing. Moreover, as the turret slide is moved forwardly the momentary actuation of the switch AS does not alter the previously described circuit conditions and resulting operations, since the contacts RS2 are open, so that the solenoid SS is not energized at this time. Therefore, as the turret is moved forwardly, the tool upon the No. 2 face effects a finishing cut upon the workpiece, this operation continuing until the operative stop screw 63 engages the stop 64 moving the latter into engagement with the fixed stop or lug 66. As in the previous operation, the resulting closing of contacts AR has no effect since the contacts TS are open. Stopping of the turret slide is effected by the above-mentioned metal-to-metal contact of screw 63, member 64 and lug 66 whereupon the operator reverses the turret by rotating the turnstile 45 in the opposite direction.

When the turret slide reaches its rearwardmost position, the indexing mechanism thereof causes the turret to bring the No. 3 face thereof into alignment with the spindle. This indexing of the turret simultaneously indexes the stop roll and the switch mechanism 57 bringing the next succeeding stop screw 63 into alignment with the stop 64 and moving the arm 61 into contact with the S3 segment. Hence, the circuit through the 2S solenoid is opened, deenergizing the latter, and substantially simultaneously the circuit for energization of the 3S solenoid is closed. Consequently, the disk 139 associated with the solenoid 3S is rocked by means of its arm 144, link 145, and pin 146 thereby rocking the collars 129a to 129e on the corresponding sleeve 128. In view of the fact that only one of these collars has been set at a position to effect movement of a switch actuating rod, namely the rod 88, this energization of the solenoid 3S moves only the rod 88 thereby operating the switch BS. Hence, the previously described circuits established during the operation of the No. 2 face are changed only to the extent that the contacts BS1 are now opened and the contacts BS2 are now closed. Therefore, the spindle continues to be rotated in a forward direction at high speed but the speed is less than that of the previous operation since the spindle is now connected through the back gearing due to the fact that the BG solenoid is energized and the DG solenoid is deenergized.

As before the operator advances the turret by use of the turnstile 45 and the momentary actuation of the switch AS during this movement has no effect since the contacts RS2 are open. As the turret is advanced, the drilling operation, corresponding to the tool or tools on the No. 3 face of the turret, is effected, the operation being completed when the stop screw 63 engages the stop member 64 and moves the latter into engagement with the stationary stop 66 thereby indicating to the operator that the turret is to be reversed. The closing of the switch AR at this time has no effect upon the circuit since the contacts TS are open. The operator now rotates the turnstile in the opposite direction moving the turret backwardly to its extreme rear position and when this position is reached, the turret is automatically indexed to bring its fourth face into alignment with the spindle.

The indexing of the turret, as just mentioned, has also indexed the stop roll to bring the fourth stop screw 63 into alignment with the stop member 64 and has also indexed the movable contact arm 61 from engagement with the segment S3 to engagement with the segment S4. This indexing of the arm 61 of the indexible switch 57 deenergizes the solenoid 3S and substantially simultaneously energizes the solenoid 4S. The energization of the 4S solenoid operates its disk 139 in a manner which will now be readily understood so that the collars thereon are rocked. In the initial setting the collars on this sleeve which are associated with the rods 87 and 88 were placed in operative relationship with respect to the corresponding grooves 132 in the rods. Therefore, this energization of solenoid 4S moves the rods 87 and 88 to operate the corresponding switches HS and BS, the other collars upon the sleeve 128 of the 4S solenoid, having been placed out of cooperation with respect to their corresponding rods, do not actuate such rods and hence the remaining switches such as RS, FS and TS remain in their initial positions.

As the turnstile 45 is now utilised to advance the turret slide and the turret thereon, the switch AS is momentarily closed, but, as before, this performs no function since the RS2 contacts remain open. Consequently the motor 26 of the machine tool is energized for rotation in a forward direction, through the circuits previously described, under the control of contacts RS1, FS1, FR1 and R4, which are all closed so that the contactor F and relay FR are energized. The motor 26 will, however, be operating at its low speed since the actuation of the HS switch, by movement of the rod 87, has opened the contacts HS1 and closed the contacts HS2 thereby energizing the L contactor so that the latter closes its contacts L1, L2, L3 and opens its contacts L4. It will be seen, therefore, that the motor 26 is now supplied with electrical energy through the contacts F1, F2, F3 and L1, L2, L3 contacts L4 preventing energization of contactor H thereby insuring that the circuit for high speed operation of the motor will not be completed while low speed operation is in progress. The operation of the BS switch by movement of the rod 88 has opened the contacts BS1 and closed the contacts BS2. Consequently the solenoid DG is deenergized and the solenoid BG is energized so that the spindle is now rotated through the back gearing.

It follows therefore that, as the turret is advanced by operation of the turnstile, the reaming operation is performed upon the part to be machined while the spindle is rotating in a forward direction at low speed. When this operation has been completed, as is indicated by the stop screw 63 moving the movable stop member 64 into solid engagement with the stationary lug 66, the operator reverses the direction of rotation of the turnstile 45 thereby returning the turret and slide to their rearwardmost positions. When the turret slide has been returned to its rearwardmost position, the indexing mechanism moves the turret to bring the No. 5 face into alignment with the spindle, this indexing also simultaneously actuating the arm 61 from engagement with the conductive segment S4 into engagement with the segment S5, the stop roll likewise being indexed to bring the No. 5 stop screw 63 into alignment with the movable stop member 64.

The movement of the contact arm 61, as just mentioned, has deenergized the 4S solenoid so that the sleeve 128 thereof returns to its initial position under action of the associated spring 138 thus restoring the collars 129a to 129e to their initial positions and permitting the operated movable rods 87, 88 to be restored to their initial positions under the action of the springs within the switches HS and BS. The energization of the solenoid 5S, as a result of the indexing of the movable arm 61 into engagement with the conductive segment S5, rotates the corresponding shaft or rod 124 and the latter operates, in a manner which will now be readily understood, to rock the associated sleeve 128 and the collars carried thereon. In the initial setting of the mechanism, the collars associated with the rods 86, 87, 88 and 89 were positioned for cooperation with these members and hence the operation of the solenoid 5S moves these rods to effect actuation of the switches FS, HS, BS and TS, respectively. The operation of these switches results in rotation of the spindle 24 in a reverse direction at the low speed of the motor and through the back gearing, it being remembered that it is desired to now effect a tapping operation productive of a left hand thread.

The circuits established by the above-mentioned switch operations and which are productive of the stated mode of operation of the machine tool will now be readily apparent from an inspection of Figs. 17 and 19. Thus, since the RS switch was not operated and the FS switch was operated, the contacts RS1 are closed, contacts FS1 are opened and contacts FS2 are closed. Therefore, the F contactor and the FR relay are deenergized and a circuit is now completed from the wire 164 through the relay RR to the wire 165. This energizes the relay RR thereby causing the latter to close its contacts RR1 and RR2. Since the F4 contacts are now closed, the R contactor is energized, thereby closing its contacts R1, R2, R3 and opening its contacts R4. Opening the contacts R4 prevents improper actuation of the F contactor, as a safety feature, while closing the contacts R1, R2 and R3 partially establishes the circuit for rotation of the motor 26 in a reverse direction. The operation of the HS switch has closed the contacts HS2 and opened the contacts HS1, thereby energizing the L contactor and deenergizing the H contactor. Hence, the energization for the motor 26 is now completed from the R1, R2, R3 contacts through the L1, L2, L3 contacts with the result that the motor is rotated at low speed and in a reverse direction. The operation of the BS switch has energized the BG solenoid and deenergized the DG solenoid, as previously described in connection with face No. 4 of the turret, so that the spindle 24 is rotated through the back gearing.

In addition to the above circuits established by operation of the solenoid 5S, the switch TS is actuated by the rod 89 thereby closing the contacts thereof which are in series with the solenoid TRS. Consequently, as the turnstile 45 is rotated to advance the turret 43 for effecting the tapping operation upon the workpiece, this tapping operation continues until the stop screw 63 engages and moves the stop member 64. This movement of the stop member 64 acts, through the cam rod 65 and switch actuator 70 to close the contacts of switch AR and, since the contacts TS were closed by the initial energization of the solenoid 5S, a circuit is now completed from the wire 164 through the switches AR and TS to and through the solenoid TRS to the wire 165 with the result that the TRS solenoid is energized. The energization of the TRS solenoid rocks its shaft 127 thereby rocking its disk 141 and associated sleeve 128, together with the collars on the latter, in a manner which will now be apparent since the TRS solenoid and its associated parts are constructed in the same manner as the 5S solenoid and its parts illustrated in Fig. 9.

The operation of the TRS solenoid has caused the interlock rod 152 to be moved to the right, as viewed in Fig. 9, due to the engagement of the pin 150 with a stop lug 156. This releases the pin 146 from the shoulder 147 on the disk 139 for the 5S solenoid so that the latter and its sleeve 128 return to their initial positions even though this solenoid remains energized. This restoration of the collars upon the sleeve 128 for the 5S solenoid to their initial positions allow the associated switch operating rods 86, 87, 88 and 89 to return to their initial positions under influence of the springs within the corresponding switches FS, HS, BS and TS. This return of the disk 139 of solenoid 5S to its initial position also removes the pin 151 from engagement with the stop member 162 so that the interlock rod 153 may now return to the right, as viewed in Fig. 9, under influence of its spring to thereby cause the latch arm 158 to engage within the groove 143 of the disk 141 for the solenoid TRS. Hence, the disk 141 and its associated sleeve and collars remain in operated position even though the solenoid TRS is deenergized by the opening of contacts TS as a result of the deenergization of solenoid 5S.

The energization of the TRS solenoid and the rocking of its sleeve 128, has, due to the setting of the collars thereon moved the switch operating rod 88 to switch operating position, thereby actuating the switch BS. The other switches RS, FS, HS and TS remain in their initial positions to which they return after release of the disk 139 associated with the solenoid 5S as just mentioned. Therefore, the motor 26 is now energized for rotation in the forward direction, at high speed, and is connected with the spindle through the back gearing. This follows from the fact that the FS and RS switches being in their initial positions, the reverse relay RR and reverse contactor R are deenergized and the forward relay FR, together with the forward contactor F are energized since the contacts RS1, FS1, FR1 and R4 are closed while contacts FS2 and F4 are open. Since the HS relay is likewise returned to its initial position, the HS1 contacts are closed and the HS2 contacts are open so that the H contactor is energized and the L contactor is deenergized. Therefore, the motor 26 is energized through the contacts F1, F2, F3 and H1, H2, H3. In view of the fact that the TRS solenoid has operated the BS switch, the contacts BS2 are closed and the contacts BS1 are opened so that the spindle will operate through the back gearing since the BG solenoid is energized and the DG solenoid is deenergized. It is evident, therefore, that the completion of the tapping operation as determined by the actuation of the stop member 64, and hence switch AR, through engagement of the former by the stop screw 63, reverses the direction of rotation of the spindle to allow withdrawal of the tap.

When the tapping operation has thus been completed and the direction of rotation of the motor 26 reversed, the operator rotates the turnstile 45 in the opposite direction to return the turret and slide to their initial positions. At the beginning of this reverse movement, the stop screw 63 will of course move from engagement with the stop member 64 so that the switch AR is opened, thereby deenergizing the relay TRS. This does not, however, change the operation of the machine since it will be remembered that the arm 158 has been moved into latching engagement with the disk 143 associated with the solenoid TRS so that the disk, and the collars operated thereby, remain in their actuated positions just as though the relay TRS remained energized. However, the deenergization of the TRS relay has moved the pin 150 from engagement with the shoulder in the notch 142 of the disk 141 so that the stop rod 152 now returns to the left under the influence of its spring 154 thereby moving the stop members 155 from engagement with the stop pins 146 so that the machine is prepared for a new operation under control of the indexible switch 57.

When the turret and slide have reached their rearwardmost positions due to actuation of the turnstile 45, the indexing mechanism moves the turret to bring the No. 6 face into alignment with the spindle. This moves the arm 61 from engagement with the conductive segment S5 and into engagement with the conductive segment S6. At the same time the stop roll 52 is indexed bringing the stop screw 63 corresponding to the sixth face of the turret into alignment with the stop lug 64. This indexing of the switching mechanism 57 has deenergized the solenoid 5S and energized the solenoid 6S. Deenergization of the solenoid 5S has no effect on the other elements of the apparatus at this time, since it will be recalled that its corresponding disk 139 was released and returned to its initial position due to operation of the block 155 when the TRS relay was actuated. Consequently, when the TRS relay was deenergized, the pin 146 for the solenoid 5S simply moved into engagement with the unnotched portion of the periphery of the disk 139. Therefore, the deenergization of the solenoid 5S at this time, simply allows the pin to be returned to a position where it is in engagement within the recess 140 of the disk 139 and hence prepared for a new operation.

The energization of the solenoid 6S rotates its shaft 125 and hence acts through the cooperating arm 144, link 145 and pin 146 to rock the corresponding disk 139 and sleeve 128 as previously described for the solenoids associated with the other faces of the turret. This rotation of the disk 139 causes the pin, such as 161, thereon to engage the block 162 on the interlock rod 153 moving the latter to the left, as viewed in Fig. 9, thereby withdrawing the latch pin or arm 158 from engagement in the notch 143 of the disk 141 associated with solenoid TRS. Consequently, this disk 141 is now returned to its initial position under the action of its associated spring 138.

The rocking of the disk 139 associated with the solenoid 6S, due to energization of the latter, has, as previously mentioned, rotated its sleeve 128 and hence the collars such as 129a to 129e which are keyed thereon. Since these collars were initially set in a manner to effect operation of the rods 85 and 88, these rods are now moved to operate the corresponding switches RS and BS. The operation of the switch RS opens the contacts RS1 and closes the contacts RS2. Opening the contacts RS1 opens the circuit extending therethrough for the forward contactor F and the forward relay FR so that the motor 26 is now deenergized except as it is momentarily energized in the reverse direction through the plugging switch PS thereby to shorten the coasting time and more rapidly bring the motor to rest.

That is to say, the movable contact 171 of the plugging switch PS, during the previous forward rotation of the motor 26, will have moved into engagement with the contact 173 since the plugging switch is connected to the armature of the motor 26. During this forward rotation the FR relay was energized so that the FR2 contacts were closed. Hence the RR relay was energized, through contacts FR2, 171 and 173, thereby closing contacts RR1 and RR2. However, so long as the motor is energized for rotation in the forward direction the reverse contactor R is not energized since contacts F4 remain open. However, upon opening of the contacts RS1, resulting deenergization of relay FR and contactor F, the contacts F4 close. This completes a circuit from the wire 164 through the contacts RR2, 171, 173 and RR1 to the reverse contactor R energizing the latter. Consequently, current is supplied to the motor 26 through the contacts R1, R2, R3 and the contacts H1, H2, H3, since the switch HS has its HS1 contacts closed. This application of current in the reverse direction to that in which the motor is coasting rapidly reduces the speed of the latter so that it may be more quickly brought to rest by operation of a conventional brake not shown. As the speed of the motor drops below a predetermined value, the contact 171 moves from engagement with the contact 173 thereby deenergizing the relay RR and contactor R so that the circuit to the motor 26 is opened as will be readily understood.

It follows therefore that the spindle 24 is now "dead," i. e., non-rotating, when the turret is indexed to bring the sixth face thereof into operative position. This is because the operations upon the postulated workpiece have been completed so there is no further operation which requires the use of the sixth face of the turret. However, had the workpiece required an additional operation, this sixth face could have been used in the same manner as any other face. The spindle would then be operated at any desired speed with or without back gearing and in the desired direction of rotation by suitably setting the collars, such as 129a, etc., upon the sleeve 128 associated with the solenoid 6S and with the collar 129a set in the "Run" position rather than the "Stop" position.

A new workpiece may be formed upon the machine by removing the completed workpiece, indexing the turret to the No. 1 face, loading a new blank and repeating the operations as previously described.

*Manual*

If, instead of fully automatic operation of the apparatus, it be desired to manually control the device, this is effected by utilizing the same switches RS, FS, HS and BS to control the direction and speed of rotation of the spindle as were utilized for the automatic operation. However, instead of employing the collars such as 129a to 129e to preselect and control the operations corresponding to the different faces of the turret, this control is effected by rocking and vertical movements of the manual lever 100.

Let it be assumed, by way of example, that the workpiece to be formed is similar to that which was formed by automatic operations but that, in this instance, the control of the machine is to be effected manually. The first operation then requires that the spindle be rotated in a forward direction at the low speed of the motor and with direct gearing. Consequently, the lever 100 is rotated to bring the arrow 107 into alignment with the indicium LD on the boss 105 and the lever 100 is moved downwardly to its lower broken line position corresponding with that marked "For." in the drawing, see Fig. 8. Switch 167 is then operated to its "On" position and the turnstile 45 rotated in the direction to advance the turret.

The setting of the lever 100 as just described has angularly moved the cam drum 96 and also axially shifted the latter so that only the cam 112 engages and moves a switch actuating rod, namely the switch actuating rod 87. Hence, the automatic switch 116 is not closed, the switches RS, FS, BS and TS remain in their normal positions while the switch HS is actuated. Since the contacts 116 have not been closed, none of the solenoids 1S through 6S, SS or TRS are energized regardless of the position of the turret. Moreover, the raised portion of cam 115a engages rod 153 of the interlock moving the latter to the left, as viewed in the drawings, thereby releasing any of the disks 143 and attached sleeves that may have been latched in switch operating position.

In view of the fact that the switches RS and FS remain in their initial positions, the contacts RS1 and FS1 thereof are closed so that a circuit is completed therethrough, as previously described under the automatic operation, energizing the relay FR and the forward contactor F. The actuation of the switch HS has opened the contacts HS1 and closed the contacts HS2. Therefore the contactor L is operated closing its contacts L1, L2, L3 and opening its contacts L4. Consequently, the motor 26 is energized for rotation at its slow speed through a circuit extending through the contacts F1, F2, F3 and L1, L2, L3. Since the switch BS was not operated, the latter is in its normal position and therefore energizes the solenoid DG for effecting connection of the motor to the spindle through the "direct" gears. The operator then effects the machining operation by rotating the turnstile to advance the turret and the tool thereon into engagement with the work on the spindle. When this machining operation has been completed, as indicated by the engagement of the stop screw 63 associated with the face of the turret being used with the stop member 64 and stop lug 66, the operator reverses the turnstile returning the turret and slide to their extreme rear positions. When the slide and turret have reached this extreme rear position, the latter is automatically indexed to bring the next face thereof into operative relationship.

The operator then moves the lever 100 to position the cam drum 96 for conditioning the machine to perform the next machining operation. In accordance with the selected example, this requires that the spindle be rotating in a forward direction at high speed and directly geared. Therefore the handle or lever 100 is moved to position the arrow 107 with the indicium HD the handle being in its lowermost broken line position as shown in Fig. 3. This disposes the cam drum so that none of the cams are in engagement with any of the switch actuating rods and hence each of the switches RS, FS, HS and BS is in its normal position. Hence, the contacts RS1, FS1, HS1 and BS1 are closed, thereby energizing the contactors F and H and the solenoid DG so that the motor 26 is rotated at its high speed in a forward direction and is connected with the spindle through the direct gearing. This machining operation is performed, as before, by moving the turnstile to advance the turret until the operation is completed and then returning the turret by rotating the turnstile in the opposite direction, whereupon the turret is indexed to bring the next face thereof into operative position.

The lever 100 is then positioned to bring the arrow 107 into alignment with the indicium marked HB and with the lever in its lowermost position. This disposes the cam drum 96 so that the cam 114 engages the projection 94 on the switch operating rod 88, thereby actuating switch BS so that the contacts BS1 are opened and the contacts BS2 are closed. Consequently, electromagnet BG is energized and electromagnet DG is deenergized with the result that the spindle is connected with the motor through the back gearing. Since the switches RS, FS and HS have not been actuated, the motor will rotate in a forward direction at high speed so that the drilling operation on the workpiece may be performed by advancing the turret as previously described.

After the drilling operation is completed the turret is returned to its initial or rearwardmost position and the turret indexed to bring the next face into operative relationship. Since this is to be a reaming operation the lever 100 is moved to bring the arrow 107 into alignment with the legend LB, the lever 100 remaining in its lowermost position. This causes cams 113 and 114 to operate the adjacent switch operating rods 87, 88 thereby actuating switches HS and BS. The switches RS and FS are not, however, actuated so that the motor is now energized to rotate in a forward direction at low speed and with back gearing through circuits which will now be readily understood.

When the reaming operation has been completed by advancing the turret and the latter has again been returned to its initial position, the turret is indexed to bring the fifth face into alignment with the spindle. This fifth face is to be utilized in effecting a tapping operation and, since it is desired to form a left-hand thread, the arrow 107 is allowed to remain in alignment with the legend LB but the lever 100 is moved to its upwardmost position, as shown in Fig. 8, for effecting reversing of the motor. Consequently, cams 111, 113 and 114 are in positions actuating their corresponding switch operating rods 86, 87, 88 so that the switches FS, HS and BS are actuated. The actuation of switch FS opens its contacts FS1 and closes its contacts FS2. The actuation of the switch HS closes the contacts HS2 and opens the contacts HS1 and the actuation of the switch BS closes the contacts BS2 and opens the contacts BS1. Therefore, the reverse contactor R, the low speed contactor L and the back gearing solenoid BG are now energized, through circuits which will be readily apparent. Hence, the motor rotates at low speed in reverse direction and is connected with the spindle through the back gearing, the tapping operation being effected by manually advancing the turret.

When the tap has entered the workpiece the required distance and the tapping operation is completed, the operator reverses the direction of the rotation of the motor to back out the tap. This may be effected by simply moving the lever 100 from its upper to its lower position. This, however, would leave the motor energized and rotating in a forward direction at low speed and with back gearing. Since no work is performed during withdrawal of the tap, it is desirable to effect this withdrawal at high speed and hence the lever 100 may, in addition to its vertical movement for effecting reversal of the motor, be turned to align the arrow 107 with either the legend HB or HD. If the lever is moved in the first of these two mentioned positions, the HS switch returns to normal position since the cam 113 is removed from engagement with the projection 93, the switch BS, however, remains actuated since the cam 114 remains in engagement with the projection 94 on the rod 88. Hence, in this position of the cam drum the motor will rotate at high speed and be connected to the spindle through the back gearing. On the other hand, if the cam drum be set at the HD position, the cam 114 would also be removed from engagement with its switch actuating rod so that the BS switch would not be actuated, thereby allowing the motor to rotate in a forward direction at the high speed with connection to the spindle through the direct gearing.

Whether the operator utilizes the HB or the HD setting is optional and is dependent somewhat on the next operation to be performed, in view of the fact that the assumed workpiece is completed by the time the tap is withdrawn from the work and the first operation on the next succeeding workpiece will employ direct gearing of the spindle, the operator could advantageously position the controller for the HD operation. However, if the next workpiece to be produced required back gearing, it would be desirable to utilize the HB position of the cam drum to prevent unnecessary actuation of switches and of the clutch for back gearing mechanism.

It will be evident that with manual operation of the device the direction of rotation of the motor and the speed thereof as well as the gearing, are controlled solely by actuation of the cam drum and are independent of the indexed position of the turret. However, the same switches RS, FS, HS, BS and the same switch actuating rods 85, 86, 87 and 88 are employed as are utilized in the automatic operation so that either manual or automatic operation may be effected with a minimum of parts. Moreover the control of the machine for different operations thereof requires a minimum of work by the operator thereby greatly facilitating formation of workpieces requiring a plurality of operations at different speeds and direction of rotation. Thus, the time required to change the speed and direction of the spindle for each operation of a complete cycle of operations may be selected in advance and then automatically initiated by indexing and moving the turret, or proper operation for each given machining operation may be manually selected and rapidly effected by use of a single lever.

While a preferred embodiment of the invention has been described in considerable detail, it will be apparent that it is not limited to the exact mechanical and electrical details of construction illustrated and described but that numerous variations may be made by those skilled in the art. For example, it is not necessary that the back gearing be effected by a mechanically shiftable clutch member operated by electromagnets since a hydraulic mechanism may be utilized employing solenoid actuated valve means to effect the control thereof. Also, in some instances it may be desirable to employ devices other than solenoids for effecting rotation of the collars controlling the switches in the operating circuit. These and other changes in the details of construction, which will readily occur to those skilled in the art are contemplated as being comprehended within the invention, therefore, the specific construction illustrated and described is intended to be construed only as the present preferred embodiment of the invention and not as a limitation thereof.

Having thus described the invention, I claim:

1. In a machine tool, a support, a rotatable spindle carried by said support, a slide carried by said support and movable thereon relative to said spindle, the said spindle and slide being adapted to carry work and tools, power means operatively connected to said spindle for rotating the latter, means including a plurality of electrical switching mechanisms for controlling the speed and direction of rotation of said spindle, separate movable members operatively associated with each of said switching mechanisms and adapted to operate the latter when moved, a plurality of motion producing means, indexing means operatively connected to said motion producing means to effect selective operation of the latter, and a plurality of manually positionable means individually movable to selectively provide operative connections between selected ones of said motion producing means and said movable members whereby the speed and direction of rotation of said spindle for each desired operation of a cycle of machining operations may be preselected by setting said manually positionable means and the preselected spindle rotations corresponding to the various operations of said cycle thereafter procured by the actuation of said indexible means to its various positions.

2. The combination as defined in claim 1 and further comprising electrical switch mechanism operatively connected to control starting and stopping of said spindle, means actuated in response to movement of said slide to a predetermined position, and means operatively interconnecting the said slide actuated means and the last-mentioned switch mechanism for operating the latter in response to actuation of the former and thereby initiate rotation of said spindle.

3. The combination as defined in claim 1 and further comprising means actuated in response to movement of said slide to a predetermined position adjacent said spindle, and means operatively interconnecting said slide actuated means and the switch mechanism controlling the direction of rotation of said spindle for operating the last-mentioned switch mechanism in response to actuation of the slide actuated means to thereby reverse the direction of rotation of the spindle.

4. The combination as defined in claim 1 and further comprising manually operatable means adapted to engage and actuate said movable members independently of the positions of said indexible means and of said plurality of manually positionable means.

5. The combination as defined in claim 1 and further comprising manually operatable means adapted to engage and actuate said movable members, and means responsive to actuation of said manually operatable means to prevent operation of said motion producing means, whereby the operation of said spindle is manually controllable by said manually operatable means independently of the positions of said indexible means and of said plurality of manually positionable means.

6. The combination as defined in claim 1 and further comprising manually operatable means settable to a plurality of different positions each representative of one speed and direction of rotation of said spindle, means on said manually operatable means selectively engageable with said movable members for selective actuation therethrough of said switching means in accordance with the position to which said manually operatable means is set, and means responsive to actuation of said manually operatable means for preventing operation of said motion producing means when said manually operatable means is set at positions thereof productive of direct actuation of said movable members.

7. In a machine tool, a support, a rotatable spindle carried by said support, a slide carried by said support and movable thereon relative to said spindle, the said spindle and slide being adapted to carry work and tools, electrically controlled means operatively connected to said spindle for rotating the latter, means including a plurality of electrical switching mechanisms operatively connected with said electrically controlled means for controlling the speed and direction of rotation of said spindle, separate movable members operatively associated with each of said switching mechanisms and adapted to operate the latter when moved, a manually operatable control member operatively associated with said movable members to effect selective operation thereof, a plurality of motion producing means, indexible means operatively connected to said motion producing means to effect selective operation of the latter, and a plurality of manually positionable means individually movable to selectively provide operative connections between selective ones of said motion producing means and said movable members, whereby the speed and direction of rotation of said spindle for each desired operation of a cycle of machining operations may be obtained by successive actuations of said manually operatable control member or the operations of the entire cycle may be preselected by setting said manually positionable means so that the preselected spindle rotations corresponding to the various operations of said cycle are thereafter procured by actuation of said indexible means to its various positions.

8. The combination as defined in claim 7 wherein the operative connections between the said indexible means and the said motion producing means comprise means operated by actuation of said manually operatable control means to prevent operation of said motion producing means in response to the indexing of said indexible member.

9. In a machine tool, a support, a rotatable spindle carried by said support, a slide carried by said support and movable thereon relative to said spindle, the said spindle and slide being adapted to carry work and tools, a reversible electric motor, means operatively connecting said motor to said spindle, means including a plurality of electrical switching mechanisms for controlling the direction and speed of rotation of said motor, separate movable members operatively associated with each of said switching mechanisms and adapted to operate the latter when moved, a plurality of motion producing means, indexible means operatively connected to said motion producing means to effect selective operation of the latter, and a plurality of manually positionable means individually movable to selectively provide operative connections between selected ones of said motion producing means and said movable members, whereby the mode of operation of said spindle for each desired portion of a cycle of machining operations may be preselected by setting said manually positionable means and the preselected spindle operation corresponding to a given portion of said cycle is thereafter automatically procured by the actuation of said indexible means to its various positions.

10. The combination as defined in claim 9 and further comprising electrical switch mechanism operatively connected to said motor to control starting and stopping thereof, means actuated in response to movement of said slide to a predetermined position, and means operatively interconnecting the said slide actuated means and the last-mentioned switch mechanism for operating the latter in response to actuation of the former to thereby initiate operation of said motor.

11. The combination as defined in claim 9 and further comprising switch means actuated in response to movement of said slide to a predetermined position adjacent said spindle, and means operatively interconnecting said slide actuated switch means and the switch mechanism controlling the direction of rotation of said spindle for operating the last-mentioned switch mechanism in response to actuation of the slide actuated switch means to thereby reverse the direction of rotation of the motor.

12. In a machine tool, a support, a rotatable spindle carried by said support, a slide carried by said support and movable thereon relative to said spindle, the said spindle and slide being adapted to carry work and tools, an electric motor, change speed mechanism operatively connecting said motor to said spindle and including an element movable to different positions to vary the speed of said spindle, electrically actuated means operatively connected to said movable element to operate the latter, electrical switching mechanism for controlling operation of said motor, electrical switching mechanism for selectively controlling the energization of said electrically actuated means to thereby effect a selected speed of said spindle, separate movable members operatively associated with each of said switching mechanisms and adapted to operate the latter when moved, a plurality of motion producing means, indexible means operatively connected to said motion producing means to effect selective operation of the latter, and a plurality of manually positionable means individually movable to selectively provide operative connections between selected ones of said motion producing means and said movable members, whereby the characteristics of operation of said spindle for each desired portion of a cycle of machining operations may be preselected by setting said manually positionable means and the preselected spindle operation corresponding to a given portion of said cycle is thereafter obtained by the actuation of said indexible means to its various positions.

13. In a machine tool, a support, a rotatable spindle carried by said support, a slide carried by said support and movable thereon relative to said spindle, the said spindle and slide being adapted to carry work and tools, a reversible multispeed electric motor, change speed mechanism operatively connecting said motor to said spindle and including an element movable to different positions to vary the speed of said spindle for any given speed of the motor, electrically actuated means operatively connected to said movable element to operate the latter, means including a plurality of electrical switching mechanisms selectively operatable to control the direction and speed of rotation of said motor and the energization of said electrically actuated means for effecting a selected speed of said spindle for a given speed of said motor, separate movable members operatively associated with each of said switching mechanisms and adapted to operate the latter when moved, a plurality of motion producing means, indexible means operatively connected to said motion producing means to effect selective operation of the latter, and a plurality of manually positionable means individually movable to selectively provide operative connections between selected ones of said motion producing means and said movable members, whereby the mode of operation of said spindle for any desired portion of a cycle of machining operations may be preselected by setting said manually positionable means and the preselected spindle operation corresponding to a given portion of said cycle is thereafter obtained by the actuation of said indexible means to its various positions.

14. In a machine tool, a support, a rotatable spindle carried by said support, a slide carried by said support and movable thereon relative to said spindle, the said spindle and slide being adapted to carry work and tools, a reversible multispeed electric motor, change speed mechanism operatively connecting said motor to said spindle and including an element movable to different positions to vary the speed of said spindle for any given speed of the motor, electrically actuated means operatively connected to said movable element to operate the latter, means including a plurality of electrical switching mechanisms selectively operatable to control the direction and speed of rotation of said motor and the energization of said electrically actuated means for effecting a selected speed of said spindle for a given speed of said motor, separate movable members operatively associated with each of said switching mechanisms and adapted to operate the latter when moved, a plurality of electrically operated motion producing means, indexible electrical switching means operatively connected to said plurality of electrically operatable means to effect selective operation of the latter, and a plurality of manually positionable means individually movable to selectively provide operative connections between selected ones of said motion producing means and said movable members, whereby the speed and direction of rotation of said spindle for any desired portion of a cycle of machining operations may be preselected by setting said manually positionable means and the preselected spindle rotation corresponding to a given portion of said cycle is thereafter obtained by the actuation of said indexible switching means to its various positions.

15. In a machine tool, a support, a rotatable spindle carried by said support, a slide carried by said support and having forward and rearward movements thereon relative to said spindle, an indexible member carried by said slide, the said spindle and member being adapted to carry work and tools, an electric motor, means operatively connecting said motor to said spindle, an electrical control circuit for said motor including a plurality of switch means for controlling the mode of operation of said motor, a separate movable member operatively associated with each of said switching means to operate the latter when moved, a plurality of motion producing means, indexible means operatively connected with said indexible member for positioning in response to indexing of said indexible member, the said indexible means being operatively connected to said motion producing means to effect selective operation thereof in accordance with the position of said indexible member, and a plurality of manually settable means individually positionable to selectively provide operative connections between each of said motion producing means and said movable members, whereby the mode of operation of said spindle for any given position of said indexible member may be preselected by operation of said manually settable means and the preselected operation corresponding to a given indexed position of said indexible member is thereafter obtained by the indexing of said indexible member.

16. The combination as defined in claim 15 and further comprising manually operatable means adapted to engage and actuate said moable members independently of the position of said indexible member and independently of the positions of said manually settable means.

17. In a machine tool, a support, a rotatable spindle carried by said support, a slide carried by said support and having forward and rearward movements thereon relative to said spindle, an indexible member carried by said slide, the said spindle and member being adapted to carry work and tools, a multispeed reversible electric motor, means operatively connecting said motor to said spindle, an electrical control circuit for said motor including switch means operatable to control the speed of rotation of said motor, switch means operatable to control the direction of rotation of said motor, and switch means operatable to interrupt the supply of electrical energy to said motor, a separate movable member operatively associated with each of said switching means to operate the latter when moved, a plurality of motion producing means, indexible means operatively connected with said indexible member for positioning in response to indexing of said indexible member, the said indexible means being operatively connected to said motion producing means to effect selective operation thereof in accordance with the position of said indexible member, and a plurality of manually settable means individually positionable to selectively provide operative connections between each of said motion producing means and any or all of said movable members whereby the mode of operation of said spindle for any given position of said indexible member may be preselected by operation of said manually settable means and the preselected operations corresponding to a given indexed position of said indexible member are thereafter obtained by the indexing of said indexible member.

18. The combination as defined in claim 17 and further comprising an additional motion producing means, and means including an electrical switch responsive to movement of said slide to a predetermined position for operating said additional motion producing means to thereby control initiation of operation of said motor in response to movement of said slide.

19. The combination as defined in claim 17 and further comprising an additional motion producing means, and means including an electrical switch responsive to movement of said slide to a predetermined position adjacent said spindle for operating said additional motion producing means and thereby effecting reversal of the direction of rotation of said motor.

20. In a machine tool, a support, a rotatable spindle carried by said support, a slide carried by said support and having forward and rearward movements thereon relative to said spindle, an indexible member carried by said slide, the said spindle and member being adapted to carry work and tools, a multispeed reversible electric motor, change speed mechanism operatively connecting said motor to said spindle and including a movable element to vary the speed of said spindle for any given speed of said motor, electrically actuated means operatively connected to said movable element to operate the latter, switch means operatable to control the speed of rotation of said motor, switch means operatable to control the direction of rotation of said motor, switch means to selectively control the energization of said electrically actuated means to thereby effect a selected speed of said spindle for a given speed of said motor, switch means selectively operatable to interrupt the supply of electrical energy to said motor, a separate movable member operatively associated with each of said switch means to operate the latter when moved, a plurality of electrically operated motion producing means, indexible switching mechanism operatively connected with said indexible member for positioning in response to indexing of said indexible member, the said indexible switching mechanism being electrically connected to said motion producing means to effect selective energization thereof in accordance with the position of said indexible member, and a plurality of manually settable means individually positionable to selectively provide operative connections between each of said motion producing means and said movable members, whereby the mode of operation of said spindle for any given position of said indexible member may be preselected by positioning of said manually settable means and the preselected operations corresponding to a given indexed position of said indexible member are thereafter obtained by the indexing of said indexible member.

21. The combination as defined in claim 20 and further comprising an additional electrically operated motion producing means, switch means adapted when operated to prepare a circuit to said additional motion producing means, an electrical switch actuated by said slide when the latter has moved to a predetermined position with respect to said spindle to complete the circuit for operation of said additional motion producing means, an additional movable member positioned to engage and operate said last-mentioned switch means, the said additional movable member being selectively connectible with any of the aforementioned motion producing means by certain of the said manually settable means, and an additional plurality of manually settable means individually positionable to selectively provide operative connections between said additional motion producing means and any of said movable members.

22. In a machine tool having an indexible member upon a slide movable toward and away from a rotatable spindle driven by a reversible multispeed motor which is adapted to be controlled by a plurality of electrical switches, the improvement which comprises a first electrical switch connected to control the speed of said motor, a second electrical switch connected to control the direction of rotation of said motor, a third electrical switch connected to control running or stopping of said motor, a first set of movable members one for each of said switches and mounted for individual movement to engage and operate the corresponding switch, a plurality of motion producing means, there being at least one motion producing means for each indexed position of said indexible member, a second set of movable members one for each of said motion producing means and respectively operatively connected thereto for movement thereby, a plurality of manually settable members mounted on each movable member of said second set and connected for movement therewith, means on each of said manually settable members adapted in one position thereof to provide an operative connection with one of said movable members of said first set respectively, the said manually settable members being movable to another position thereof in which the said settable members do not provide an operative connection with the members of the first set, and means responsive to indexing movement of said indexible member for effecting selective actuation of said motion producing means.

23. The combination as defined in claim 22 and further comprising manually operable means adapted to selectively engage and actuate the movable members of said first set independently of the positions of said indexible member and of the plurality of manually settable members.

24. The combination as defined in claim 22 and further comprising manually operatable means adapted to selectively engage and actuate said movable members of said first set, and means responsive to actuation of said manually operatable means to prevent operation of said plurality of motion producing means, whereby the operation of said spindle is manually controllable by said manually operatable means independently of the positions of said indexible member and of said plurality of manually settable members.

25. The combination as defined in claim 22 and further comprising manually operatable means movable to a plurality of different positions each representative of one mode of operation of said spindle, means on said manually operatable means selectively engageable with separate members of said first set of movable members for selective actuation therethrough of said switches in accordance with the position to which said manually operatable means is set, and means responsive to actuation of said manually operatable means for preventing operation of said motion producing means when said manually operatable means is set at positions thereof productive of direct actuation of said movable members.

26. In a machine tool having an indexible member upon a slide movable toward and away from a rotatable spindle driven by a reversible multispeed motor which is adapted to be controlled by a plurality of electrical switches, the improvement which comprises a first electrical switch connected to control the speed of said motor, a second electrical switch connected to control the direction of rotation of said motor, a third electrical switch connected to control running or stopping of said motor, a first set of members one for each of said switches and mounted for individual movement to engage and operate the corresponding switch, a plurality of motion producing means, there being at least one motion producing means for each indexed position of said indexible member, a second set of members one for each of said motion producing means and respectively operatively connected thereto for movement thereby, the said members of said second set extending transversely of the members of said first set, a plurality of manually settable members mounted on each member of said second set and connected for movement therewith, the number of said manually settable members on each member of said second set corresponding to the number of members of said first set, means on each of said manually settable members adapted in one position thereof to provide an operative connection with one of said members of said first set respectively, the said manually settable members being movable to another position thereof in which the said settable members do not provide an operative connection with the members of the first set, and means responsive to indexing movement of said indexible member for effecting selective actuation of said motion producing means.

27. In a machine tool having an indexible member upon a slide movable toward and away from a rotatable spindle driven by a reversible multispeed motor through electrically controlled change speed gearing with the motor adapted to be controlled by a plurality of electrical switches, the improvement which comprises a first electrical switch connected to control the speed of said motor, a second electrical switch connected to control the direction of rotation of said motor, a third electrical switch connected to control running or stopping of said motor, a fourth electrical switch connected to control the change speed gearing, a first set of members one for each of said switches and mounted for individual longitudinal movement to engage and operate the corresponding switch, a plurality of motion producing means, there being at least one motion producing means for each indexed position of said indexible member, a second set of members one for each of said motion producing means and respectively connected thereto for movement thereby, the said members of said second set extending transversely of the members of said first set, a plurality of manually settable members mounted on each member of said second set and connected for movement therewith, means on each of said manually settable members adapted in one position thereof to provide an operative connection with one of said elongated members of said first set respectively, the said manually settable members being movable to another position thereof in which the said settable members do not provide an operative connection with the elongated members of the first set, and means responsive to indexing movement of said indexible member for effecting selective actuation of said motion producing means.

28. In a machine tool having an indexible member upon a slide movable toward and away from a rotatable spindle driven by a reversible multispeed motor which it adapted to be controlled by a plurality of electrical switches, the improvement which comprises a first electrical switch connected to control the speed of said motor, a second electrical switch connected to control the direction of rotation of said motor, a third electrical switch connected to control running or stopping of said motor, a fourth electrical switch, a first set of elongated members one for each of said switches and mounted for individual longitudinal movement to engage and operate the corresponding switch, a plurality of electrically operated motion producing means, there being one motion producing means for each indexed position of said indexible member and at least one additional motion producing means, a second set of elongated members one for each of said motion producing means and respectively operatively connected thereto for movement thereby, the said elongated members of said second set extending transversely of the members of said first set, a plurality of manually settable members mounted on each elongated member of said second set and connected for movement therewith, means on each of said manually settable members adapted in one position thereof to provide an operative connection with one of said elongated members of said first set respectively, the said manually settable members being movable to another position thereof in which the said settable members do not provide an operative connection with the elongated members of the first set, indexible electrical switching means responsive to indexing movement of said indexible member for effecting selective actuation of those of the said motion producing means corresponding with each indexed position of said indexible member, an electrical switch operated by said slide when the latter has moved to a predetermined position with respect to said spindle, the said slide actuated switch and said fourth switch jointly controlling operation of said additional motion producing means whereby the mode of operation of said spindle for any desired portion of a cycle of machining operations corresponding to an indexed position of said indexible member may be preselected by positioning of said settable means and the preselected operations thereafter initiated by indexing of said indexible member and movement of said slide.

29. The combination as defined in claim 28 and further comprising mechanical interlock means cooperating with each of said elongated members of said second set of elongated members to prevent simultaneous actuation of said first set of elongated members by the said motion producing means corresponding to the indexed positions of the indexible member and by said additional motion producing means.

30. The combination as defined in claim 28 and further comprising mechanical interlock means including means to release the said first set of elongated members from operation by said motion producing means corresponding with the indexed positions of said indexible member when said additional motion producing means is energized and to release the said first set of elongated members from operation by said additional motion producing means when one of the said motion producing means corresponding to the indexible positions of said turret is energized.

RALPH H. SCHUMAN.

REFERENCES CITED

The following references are of record in the file of this patent:

UNITED STATES PATENTS

| Number | Name | Date |
|---|---|---|
| 1,193,258 | Gorman | Aug. 1, 1916 |
| 1,269,489 | Murphy | Jan. 11, 1918 |
| 2,405,686 | Clark | Aug. 13, 1946 |